(12) United States Patent
Nelson

(10) Patent No.: US 12,148,300 B1
(45) Date of Patent: *Nov. 19, 2024

(54) PLOW COLLATERAL DAMAGE MITIGATING SYSTEM

(71) Applicant: Chris Lee Nelson, North East, PA (US)

(72) Inventor: Chris Lee Nelson, North East, PA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/699,147

(22) Filed: Mar. 20, 2022

Related U.S. Application Data

(63) Continuation-in-part of application No. 16/746,907, filed on Jan. 19, 2020, now Pat. No. 11,427,979.

(60) Provisional application No. 63/182,961, filed on May 2, 2021, provisional application No. 63/163,799, filed on Mar. 20, 2021.

(51) Int. Cl.
*G08G 1/16* (2006.01)
*E01H 5/06* (2006.01)

(52) U.S. Cl.
CPC .............. *G08G 1/16* (2013.01); *E01H 5/061* (2013.01)

(58) Field of Classification Search
CPC .................................. G08G 1/16; E01H 5/061
See application file for complete search history.

(56) References Cited

U.S. PATENT DOCUMENTS

| | | | |
|---|---|---|---|
| 1,475,878 A | 11/1923 | Rellstab | |
| 5,524,368 A | 6/1996 | Struck et al. | |
| 6,621,448 B1 | 9/2003 | Lasky et al. | |
| 6,640,468 B2 | 11/2003 | Menze | |
| 6,705,028 B2 | 3/2004 | Hanafusa et al. | |
| 7,100,312 B2 | 9/2006 | Wakitani et al. | |
| 7,185,449 B2 * | 3/2007 | Kime | E01H 10/007 37/234 |
| 8,510,047 B2 | 8/2013 | Lomes | |
| 8,695,238 B2 * | 4/2014 | Warchola | E01H 5/063 37/234 |
| 9,113,300 B2 | 8/2015 | Marti et al. | |
| 10,084,556 B1 | 9/2018 | Young et al. | |
| 11,427,979 B1 * | 8/2022 | Nelson | H01B 11/1895 |
| 2002/0133981 A1 | 9/2002 | Menze | |
| 2005/0288007 A1 | 12/2005 | Benco et al. | |
| 2012/0174445 A1 | 7/2012 | Jones et al. | |
| 2015/0107135 A1 | 4/2015 | Fukano et al. | |
| 2017/0017234 A1 | 1/2017 | Wilson | |

* cited by examiner

*Primary Examiner* — Gertrude Arthur Jeanglaude
(74) *Attorney, Agent, or Firm* — The Law Office of Patrick F. O'Reilly, III, LLC

(57) ABSTRACT

A plow collateral damage mitigating system for the minimization of collateral damage done by otherwise routine and/or careless usage of a plow blade is disclosed herein. In one or more embodiments, the system includes a signal transmission cable configured to be disposed around a periphery of an area that is to be plowed; one or more receivers on a snow plow device or vehicle that are configured to receive at least one signal conveyed by the signal transmission cable; at least one actuator controlling an orientation of a plow blade of the snow plow device; and a control unit configured to automatically control the orientation of the plow blade by means of adjusting the at least one actuator based upon the at least one signal of the signal transmission cable so as to avoid damaging a boundary feature and/or obstruction disposed at the periphery of the area being plowed.

18 Claims, 22 Drawing Sheets

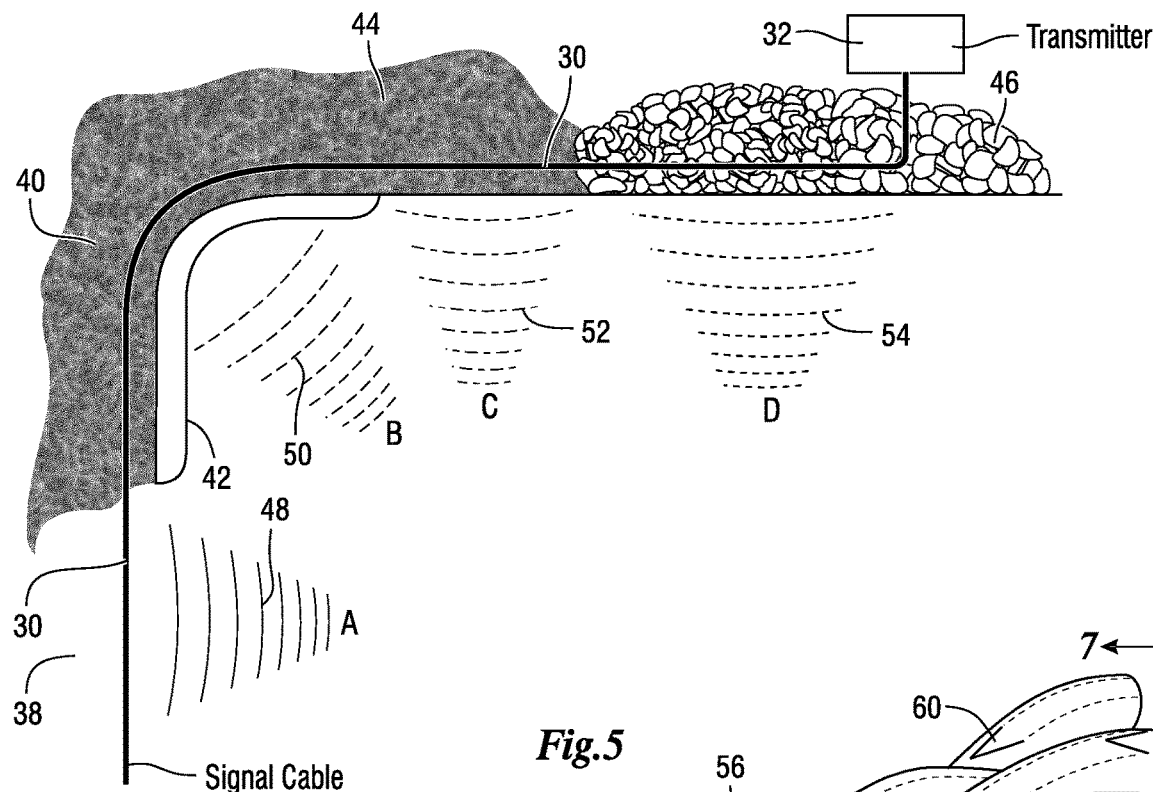
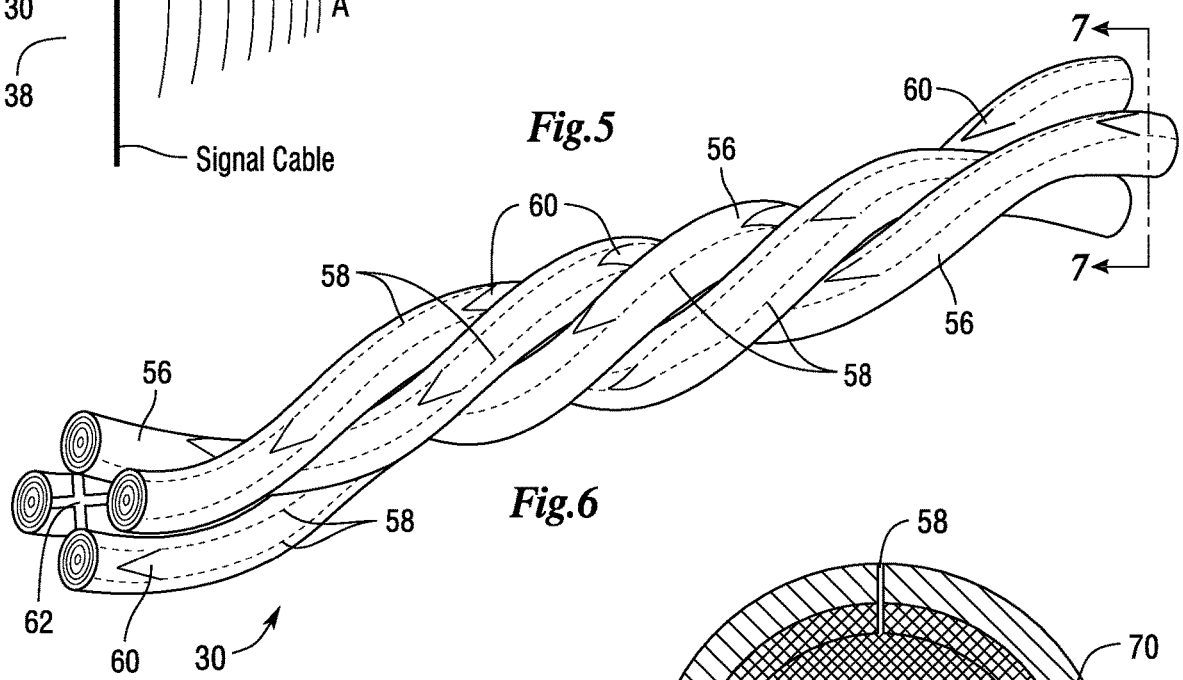
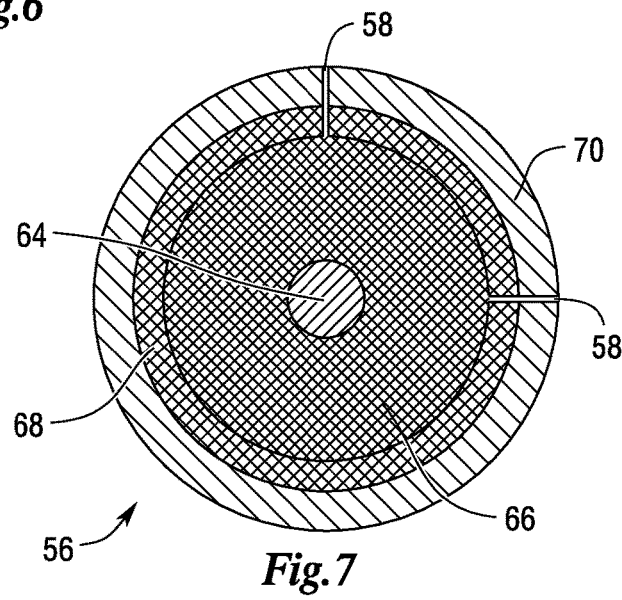

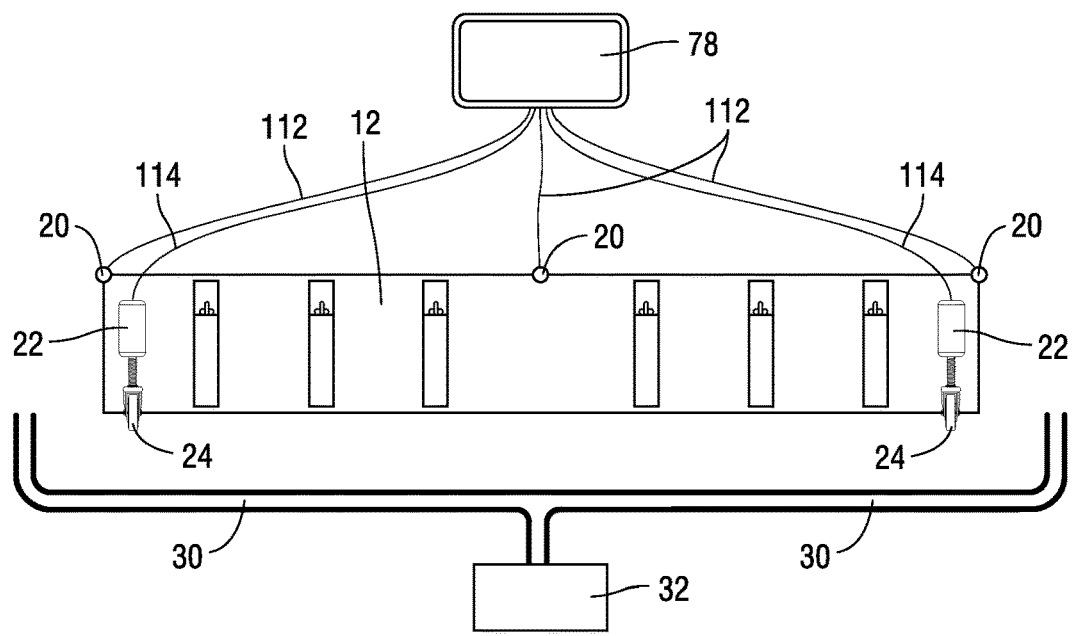
*Fig.10*
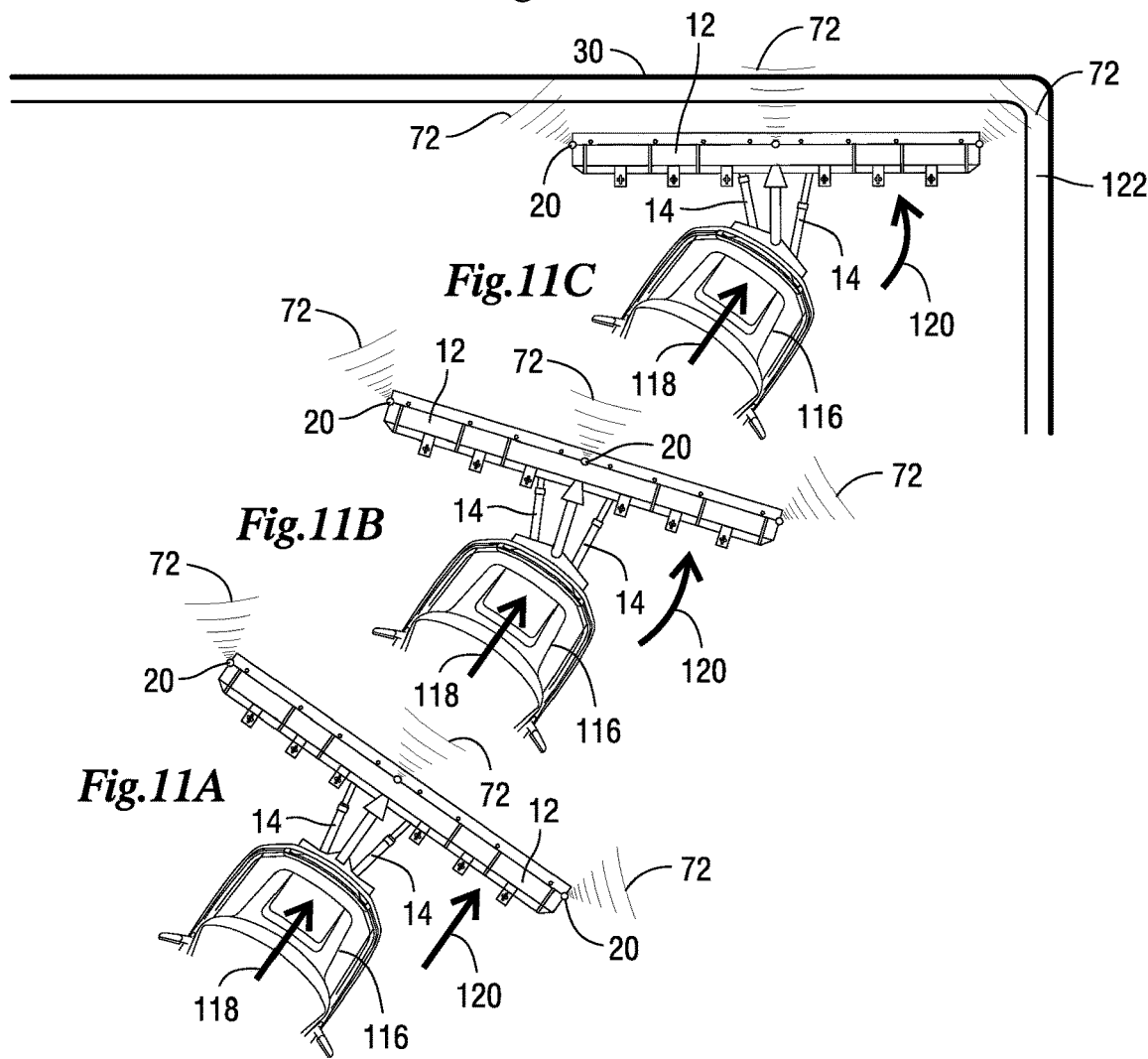

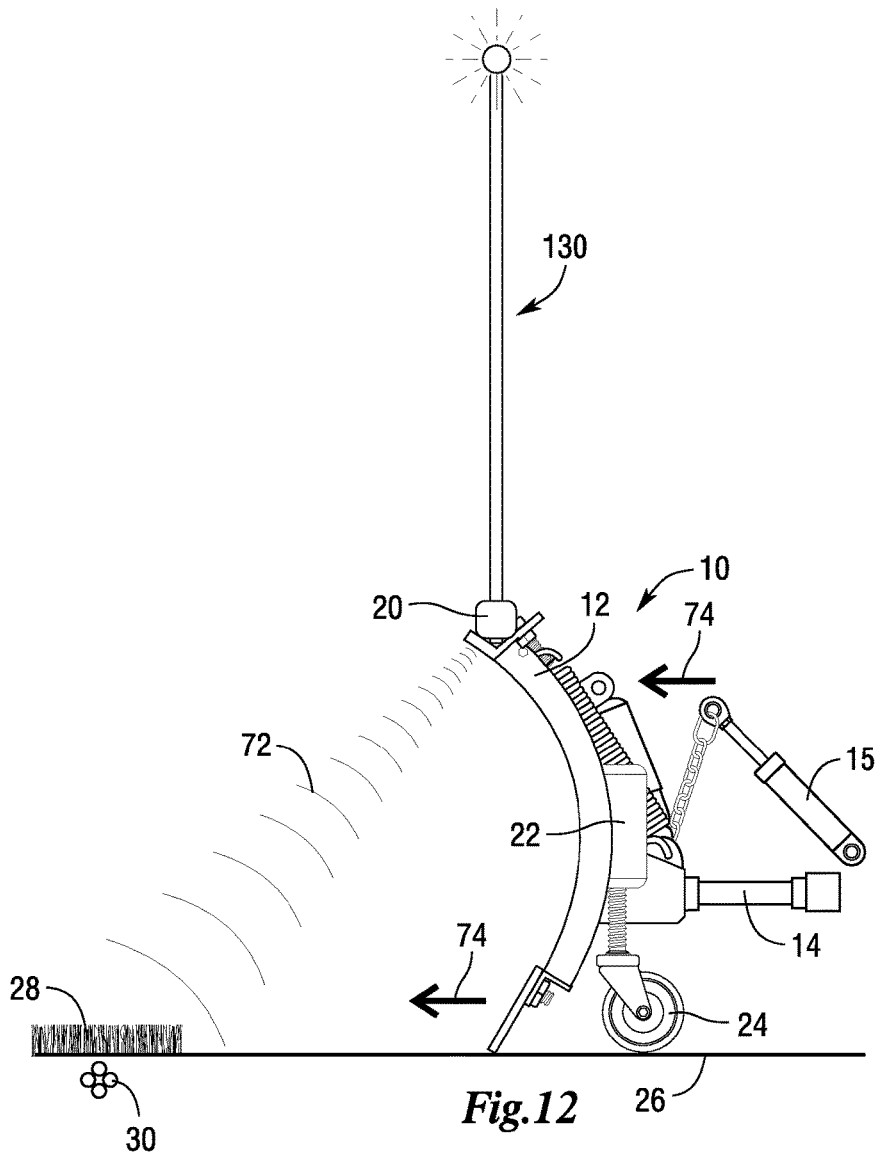
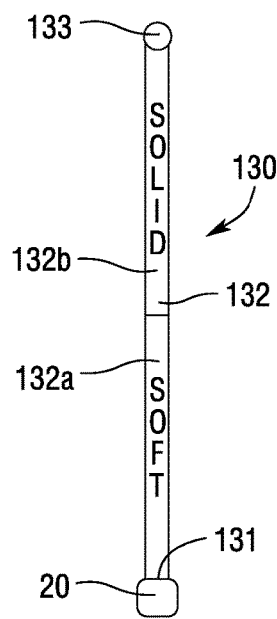
Fig.12
Fig.13

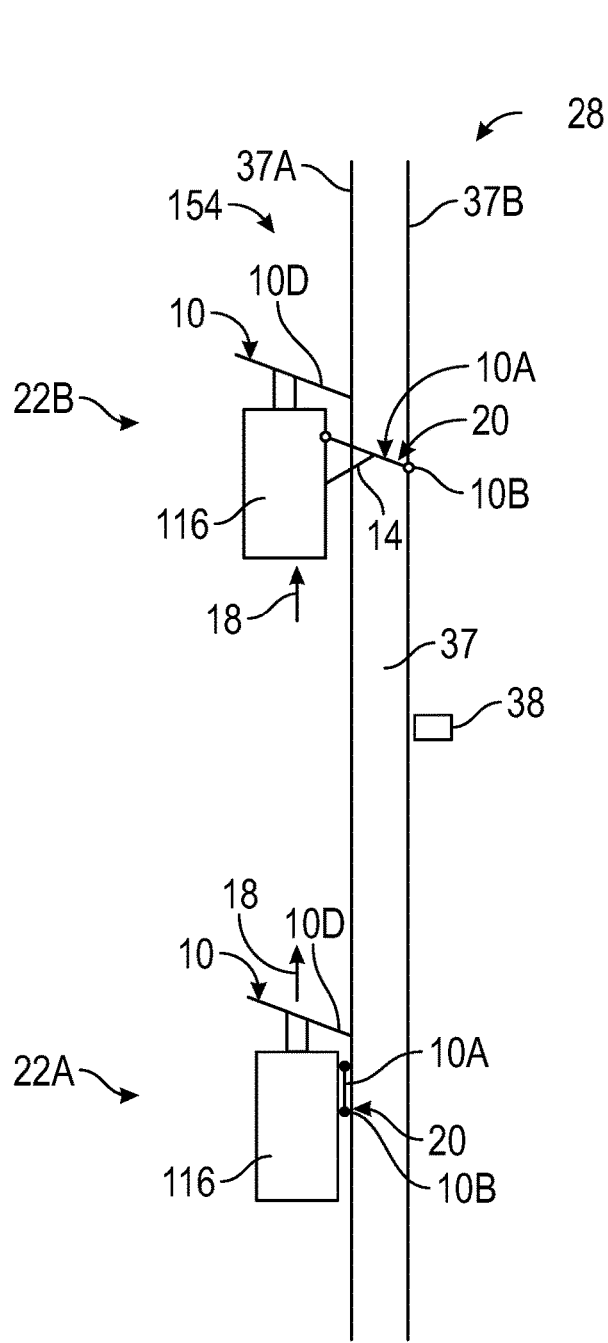
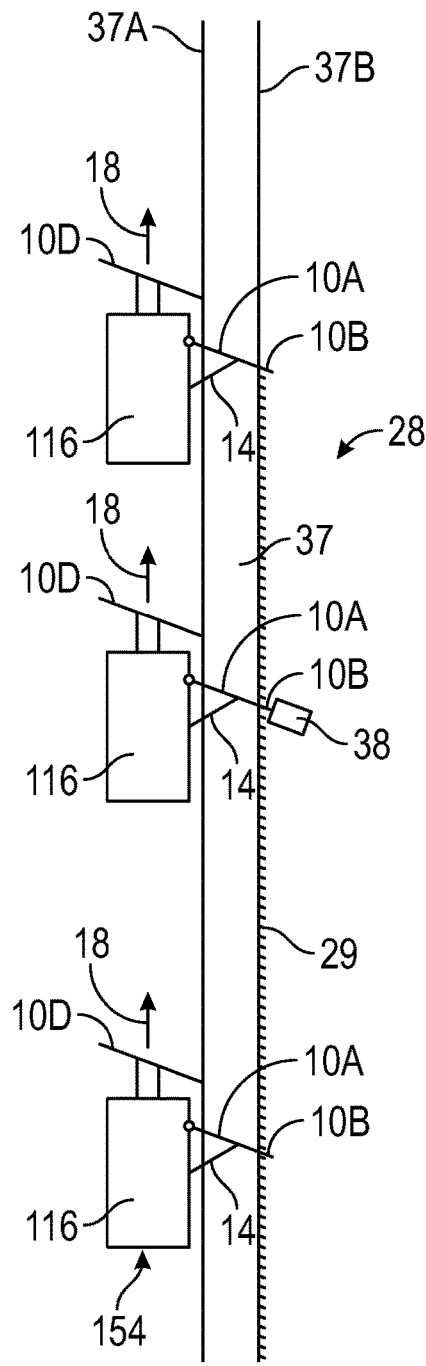
*Fig. 22*          *Fig. 23*

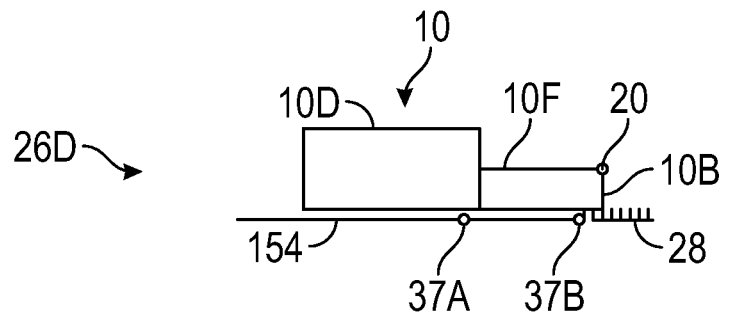
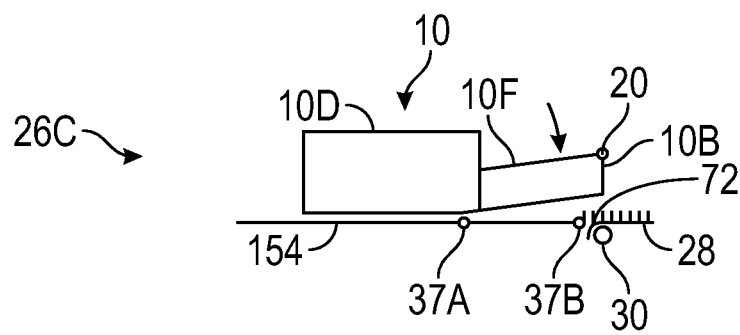
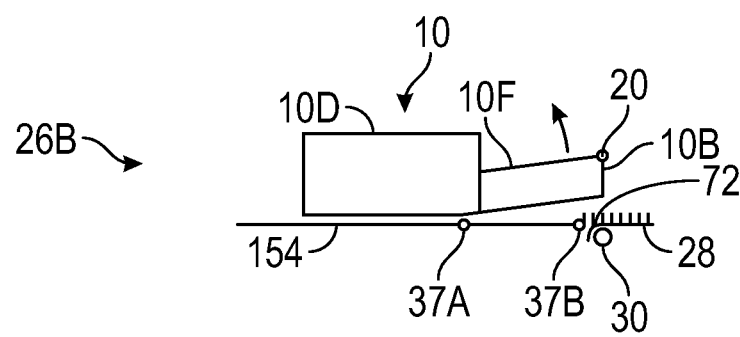
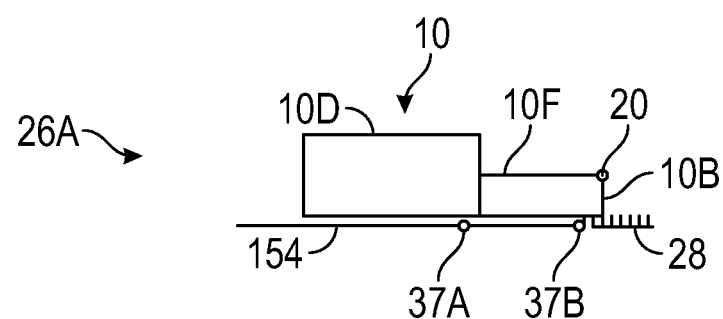
*Fig. 26*

PLOW COLLATERAL DAMAGE MITIGATING SYSTEM

CROSS-REFERENCE TO RELATED APPLICATIONS

This patent application claims priority to U.S. Provisional Patent Application No. 63/163,799, entitled "Intermittently/variably illuminated plow positional indicator mast", filed on Mar. 20, 2021, and U.S. Provisional Patent Application No. 63/182,961, entitled "Plow-related damage mitigation system for friable surfaces", filed on May 2, 2021, and is a continuation-in-part of U.S. Nonprovisional patent application Ser. No. 16/746,907, entitled "Plow Collateral Damage Mitigating System", filed on Jan. 19, 2020, the disclosure of each of which is hereby incorporated by reference as if set forth in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a plow collateral damage mitigating system. More particularly, the invention relates to an automatic plow collateral damage mitigating system for the purpose of minimizing damage caused by plowing activity, particularly to surrounding lawn, landscaping features, and obstructions, as well as to the equipment itself.

2. Background

In a typical plowing scenario, a snowplow operator arrives at the work site and usually operates the plow with it either in the fully up or down position. Generally, there are very few subtleties in snow plowing.

While watching for perimeter snow plowing stakes or other markers, the plow operator attempts to avoid obstructions. However, markers are often obliterated or knocked down with significant snowfall and cannot or will not be replaced during the winter season. Also, modern parking lots are commonly designed as more or less convoluted mazes, often with speed bumps and landscape features, or simply areas of grass, surrounded by curbs, in order to prevent speeding and corner cutting by drivers.

For purposes of safety, most surfaces are required to have complete snow removal with the blade in full contact with the supporting surface. For reasons of liability, especially in public parking lots, shoes or skids are not employed on the underside of the plow because they maintain a constant raised position of the plow blade above the surface upon which members of the public walk and drive, leaving residual snow behind. This is due to the fact that with subsequent plowing, the snow will continue to accumulate as the plow shoe or skid rides higher and higher upon the snow and ice that have been left behind and packed down after previous incomplete removal.

While in the full down position, the plow blade generally will be susceptible to damage if it hits any obstructions such as curbs, various substantial landscape features, or other hazards often associated with the parking or redirecting of vehicles. More commonly, however, the blade causes very substantial damage to surrounding soft landscape features, such as a lawn. Noticeable after the snow has melted is lawn/sod that has been peeled away from the margins of the driveway or parking lot. Often the damage is very substantial requiring sod replacement and/or re-seeding. Also, any non-fixed precast concrete parking devices such as turtles are often displaced from the parking surface onto the surrounding areas. This can cause substantial damage, displacement and disruption, which is costly and often physically demanding to repair.

It is very likely that most property owners would prefer not to have substantial damage done to their properties simply because 1 or 2 inches of snow have fallen. And yet substantial damage can be done to an otherwise well-maintained lawn in not more than just a few seconds with careless use of a piece of plowing equipment. Another variable may reside in the driver's seat of the plow vehicle as an operator may be forced to care for a site with which he or she is unfamiliar due to sickness, absence or injury on the part of the regular driver.

Therefore, what is needed is a plow collateral damage mitigating system that mitigates the damage described above, particularly to surrounding lawn, landscaping features, and obstructions, as well as to the equipment itself. Moreover, there is a need for a plow collateral damage mitigating system that allows for variably automatic elevating, tilting, pivoting, or other mechanical manipulation of a plow blade attached to a vehicle. Furthermore, there is a need for a plow collateral damage mitigating system that allows for visual cues and/or audio cues for the operator to supplement and/or replace border/obstruction/hazard-marking devices, such as stakes that may be damaged or knocked down during the snow fall season.

BRIEF SUMMARY OF EMBODIMENTS OF THE INVENTION

Accordingly, the present invention is directed to a plow collateral damage mitigating system that substantially obviates one or more problems resulting from the limitations and deficiencies of the related art.

In accordance with one or more embodiments of the present invention, there is provided a a plow collateral damage mitigating system that includes a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area; one or more receivers configured to be coupled to the snow plow device or a vehicle on which the snow plow device is mounted, the one or more receivers configured to receive the at least one signal conveyed by the at least one signal wire of the signal transmission cable; and at least one positional indicator mast configured to be coupled to the snow plow device or the vehicle on which the snow plow device is mounted, the at least one positional indicator mast configured to be at least partially visible by a plow operator and function to aid the plow operator in monitoring a position of a plow blade of the snow plow device in relation to a boundary of a surface to be cleared of snow, the at least one positional indicator mast configured to be intermittently and/or variably illuminated based upon a proximity of the boundary of the surface to be cleared of snow as determined by the at least one signal of the signal transmission cable received by the one or more receivers.

In a further embodiment of the present invention, the at least one positional indicator mast is attached to a top of the plow blade proximate to at least one end of the plow blade or a middle of the plow blade, and the at least one positional indicator mast comprises an elongate body portion extending upwardly from the top of the plow blade.

In yet a further embodiment, the at least one positional indicator mast comprises a warning light portion disposed on or proximate to a top of the at least one positional indicator mast, the warning light portion comprising at least one light emitting device that is intermittently and/or variably illuminated based upon the proximity of the boundary of the surface to be cleared of snow.

In still a further embodiment, the at least one light emitting device of the warning light portion of the at least one positional indicator mast is intermittently illuminated or continually illuminated when a portion of the plow blade on which the at least one positional indicator mast is attached comes within a predetermined first distance from the boundary of the surface to be cleared of snow as determined by a strength of the at least one signal of the signal transmission cable received by the one or more receivers.

In yet a further embodiment, when the portion of the plow blade on which the at least one positional indicator mast is attached comes within the predetermined first distance from the boundary, and the at least one light emitting device of the warning light portion of the at least one positional indicator mast is intermittently illuminated, a blink rate of the at least one light emitting device gradually increases as the portion of the plow blade moves closer to the boundary until reaching a prescribed second distance, upon which the at least one light emitting device is continually illuminated.

In still a further embodiment, the at least one positional indicator mast comprises a first positional indicator mast attached to a first portion of the plow blade and a second positional indicator mast attached to a second portion of the plow blade, the first positional indicator mast having a first warning light portion with a first light emitting device, and the second positional indicator mast having a second warning light portion with a second light emitting device; and the first light emitting device of the first warning light portion of the first positional indicator mast is configured to be illuminated at a first blink rate, and the second light emitting device of the second warning light portion of the second positional indicator mast is configured to be illuminated at a second blink rate that is faster than the first blink rate when the second portion of the plow blade is located closer to the boundary as compared to the first portion of the plow blade.

In yet a further embodiment, the at least one positional indicator mast further comprises a first boundary hazard subsection and a second boundary hazard subsection, the first boundary hazard subsection comprising first markings or one or more words that indicate to the plow operator that the boundary comprises soft boundary conditions, the second boundary hazard subsection comprising second markings or one or more words that indicate to the plow operator that the boundary comprises solid boundary conditions, the first markings or one or more words on the first boundary hazard subsection configured to be illuminated when the boundary is determined to comprise soft boundary conditions, and the second markings or one or more words on the second boundary hazard subsection configured to be illuminated when the boundary is determined to comprise solid boundary conditions.

In still a further embodiment, the one or more receivers are provided as part of the at least one positional indicator mast such that the at least one positional indicator mast is configured as a standalone unit for mounting on the snow plow device or the vehicle.

In yet a further embodiment, the plow collateral damage mitigating system further comprises a control unit operatively coupled to the one or more receivers and the at least one positional indicator mast, the control unit configured to automatically control the illumination of the at least one positional indicator mast based upon the at least one signal of the signal transmission cable that is indicative of the proximity of the boundary of the surface to be cleared of snow.

In accordance with one or more other embodiments of the present invention, there is provided a plow collateral damage mitigating system that includes a signal transmission cable configured to be disposed along a transition boundary between a paved surface and a friable surface of an area that is to be plowed by a snow plow device, the signal transmission cable including at least one signal wire, the at least one signal wire configured to convey at least one signal originating from a signal transmitter disposed in or proximate to the area; one or more receivers configured to be coupled to the snow plow device or a vehicle on which the snow plow device is mounted, the one or more receivers configured to receive the at least one signal conveyed by the at least one signal wire of the signal transmission cable; at least one actuator controlling an orientation of a plow blade of the snow plow device; and a control unit operatively coupled to the one or more receivers and the at least one actuator, the control unit configured to automatically raise the plow blade of the snow plow device by means of adjusting the at least one actuator based upon the at least one signal of the signal transmission cable at the transition boundary between the paved surface and the friable surface so as to avoid damaging the friable surface of the area being plowed.

In a further embodiment of the present invention, the plow collateral damage mitigating system further comprises a wheel disposed below, and connected to the at least one actuator; and the control unit is configured to automatically lower the wheel by means of the at least one actuator upon encountering the transition boundary so as to raise the plow blade of the snow plow device to avoid damaging the friable surface of the area being plowed.

In yet a further embodiment, the control unit is configured to raise the plow blade of the snow plow device upon encountering the transition boundary by utilizing the at least one actuator to lift the entire plow blade to avoid damaging the friable surface of the area being plowed.

In still a further embodiment, the control unit is configured to automatically identify one or more areas containing friable surfaces that are to be plowed by storing and accessing Global Positioning System (GPS) coordinates of the one or more areas.

In yet a further embodiment, the control unit comprises a calibration dial or switch configured to allow a plow operator to input specific surface conditions of the one or more areas containing friable surfaces so that the control unit is able to automatically vary a height of the plow blade and/or customize audial and/or visual cues based upon the specific surface condition of a particular friable surface.

In accordance with yet one or more other embodiments of the present invention, there is provided a plow collateral damage mitigating system that includes at least one signal transmitter disposed in or proximate to a roadside area that is to be plowed by a snow plow device, the at least one signal transmitter configured to emit at least one signal; one or more receivers configured to be coupled to the snow plow device or a vehicle on which the snow plow device is mounted, the one or more receivers configured to receive the at least one signal emitted from the at least one signal transmitter; at least one actuator controlling an orientation of a wing plow blade of the snow plow device; and a control unit operatively coupled to the one or more receivers and the at least one actuator, the control unit configured to automatically control the orientation of the wing plow blade of the snow plow device by means of adjusting the at least one actuator based upon the at least one signal of the signal transmission cable so as to avoid damaging a boundary feature and/or obstruction disposed in or proximate to the roadside area being plowed.

In a further embodiment of the present invention, the at least one actuator controls the orientation of the wing plow blade of the snow plow device by rotating the wing plow blade in a transverse plane so as to avoid damaging the boundary feature and/or obstruction disposed in or proximate to the roadside area being plowed.

In yet a further embodiment, the at least one actuator controls the orientation of the plow blade of the snow plow device by lifting one end of the plow blade so as to avoid damaging the boundary feature and/or obstruction disposed in or proximate to the roadside area being plowed.

In still a further embodiment, the control unit comprises a plurality of setting controls for controlling an operation of the wing plow blade of the snow plow device, the plurality of setting controls being selected from the group consisting of: (i) stowing and deploying controls for the wing plow blade, (ii) angle of deployment controls for increasing and deceasing an angle of deployment of the wing plow blade, (iii) height of deployment controls for increasing and deceasing a height of deployment of the wing plow blade, (iv) auto-retraction controls for enabling and disabling auto-retraction of the wing plow blade, and (v) auto-redeployment controls for enabling and disabling auto-redeployment of the wing plow blade.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 5 is a diagram depicting a typical work site with various perimeter hazards illustrated including dirt (A), grass with a curb obstruction (B) and without a curb obstruction (C), as well as rock obstructions (D), and wherein a representation of different signals emitted from each segment of the signal cable, in order to trigger a different reaction from the current system, is also illustrated;

FIG. 6 is a perspective view of a plurality of signal transmission cables arranged in a helical bundle, according to one illustrative embodiment of the plow collateral damage mitigating system;

FIG. 7 is a sectional view cut through one of the signal transmission cables in the helical bundle, wherein the section is generally cut along the cutting-plane line 7-7 in FIG. 6;

FIG. 10 illustrates the major components of the illustrative embodiment of the plow collateral damage mitigating system in schematic form;

FIG. 11A illustrates a transverse plane orientation mechanism in a first stage of action with an oblique approach angle to a boundary, according to one illustrative embodiment of the plow collateral damage mitigating system;

FIG. 11B illustrates the transverse plane orientation mechanism of FIG. 11A in a second stage of action where the "squaring up" of the plow device has begun;

FIG. 11C illustrates the transverse plane orientation mechanism of FIG. 11A in a third stage of action depicting the resulting "squaring up" or parallelism resulting from automatic re-orientation to minimize damage from, in this case, the driver's side bottom corner of the blade to the bordering grass;

FIG. 12 is a side view of an indicator mast assembly mounted atop a blade of a plow assembly, according to one illustrative embodiment of the plow collateral damage mitigating system;

FIG. 13 is another side view of the indicator mast assembly of FIG. 12;

FIG. 22 is a diagrammatic overhead view of a plow vehicle with a plow assembly proceeding on paved surface;

FIG. 23 is a diagrammatic overhead view of a plow vehicle with a plow assembly proceeding on paved surface without the benefit of municipal plow control unit functionality;

FIG. 26 is a diagrammatic front view of the plow vehicle with the plow assembly of FIG. 25 proceeding on the paved surface while the main municipal plow blade improperly overlaps edge of road;

Throughout the figures, the same parts are always denoted using the same reference characters so that, as a general rule, they will only be described once.

DETAILED DESCRIPTION OF EMBODIMENTS OF THE INVENTION

Figure 1A:
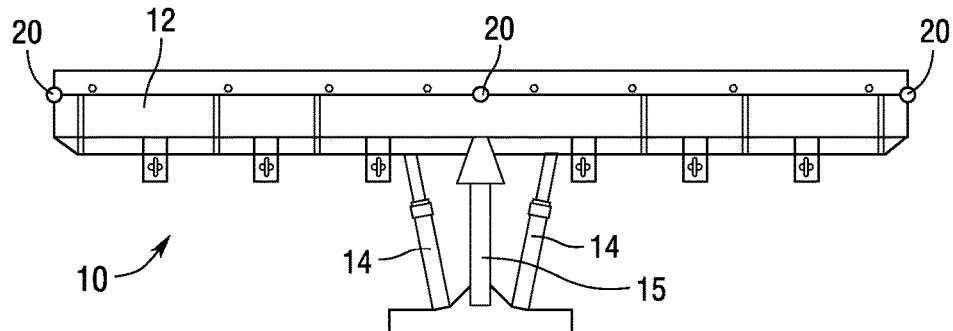
FIG. 1A is a top plan view of a snow plow device with receiver antennae at each end, and in the middle, of a straight non-articulated plow blade, according to one illustrative embodiment of the plow collateral damage mitigating system.

There has thus been outlined above, rather broadly, some of the features of the invention in order that the detailed description may be better understood, and in order that the present contribution to the art may be better appreciated. There are additional features of the invention that will be described hereinafter.

In this respect, before explaining one or more illustrative embodiments of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description, and should not be regarded as limiting.

The major components of an illustrative embodiment of a plow collateral damage mitigating system are schematically illustrated in FIG. 10. As shown in the schematic representation of FIG. 10, the plow collateral damage mitigating system generally comprises a signal transmission cable 30 configured to be disposed around a periphery of an area that is to be plowed by a snow plow device, the signal transmission cable 30 including at least one signal wire, the at least one signal wire configured to convey at least one signal originating from a signal transmitter 32 disposed in or proximate to the area; one or more receivers 20 configured to be coupled to the snow plow device or a vehicle on which the snow plow device is mounted, the one or more receivers 20 configured to receive the at least one signal conveyed by the at least one signal wire of the signal transmission cable 30; at least one actuator 22 controlling an orientation of a plow blade 12 of the snow plow device; and a control unit 78 operatively coupled to the one or more receivers 20 and the at least one actuator 22, the control unit 78 configured to automatically control the orientation of the plow blade 12 of the snow plow device by means of adjusting the at least one actuator 22 based upon the at least one signal of the signal transmission cable 30 so as to avoid damaging a boundary feature and/or obstruction disposed at the periphery of the area being plowed.

Turning now descriptively to the drawings of the illustrative embodiment, in which similar reference characters denote similar elements throughout the views, the figures illustrate vertical orientation mechanisms, a transverse plane orientation mechanism, perimeter control devices, and control unit or control module.

1. Vertical Orientation Mechanisms

Figure 2:
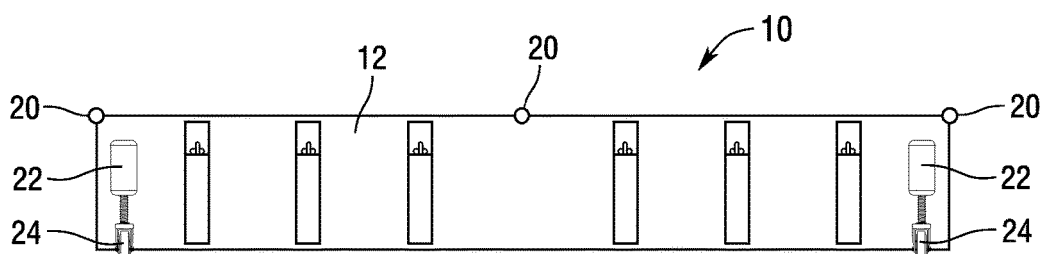
FIG. 2 is a rear elevational view of a snow plow device with a receiver antenna at each end, and in the middle, of a non-articulated plow blade, according to one illustrative embodiment of the plow collateral damage mitigating system.
Figure 3:
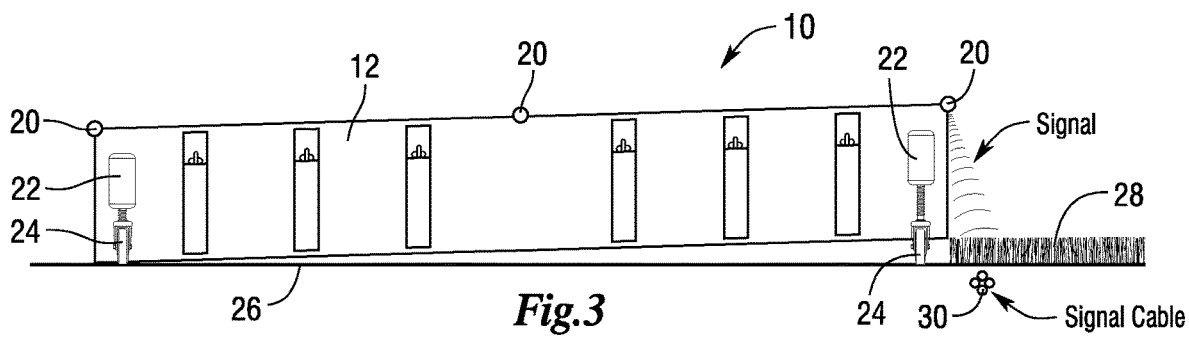
FIG. 3 is another rear elevational view of the snow plow device of FIG. 2, wherein one end of the non-articulated plow blade has been lifted to avoid an obstruction.

In FIGS. 2 and 3, a straight non-articulated plow blade assembly 10 that includes outboard vertical orientation mechanisms is illustrated. As shown in these figures, mounted on the back side and inset from both ends of the plow frame, and opposite the pushing surface, are two wheels 24 which in their non-operative positions are somewhat above the level of the inferior portion of the straight plow blade 12. Each wheel 24 is suspended from, and integral to, an electric motorized or hydraulic mechanism 22, which variably deploys the respective wheel 24 in a downward or upward position depending upon signals received from the transmitter 32. The resulting effect is to cantilever the corner of the plow blade 12 upward and over, for example, soft hazards such as the grass 28 at the parking lot boundary in FIG. 3.

In the illustrative embodiment, the wheel mechanisms 22, 24 inset from each end of the plow blade 12 function independently from the mechanism at the opposite end of the blade 12, although both may function simultaneously to raise the plow blade 12 completely from the supporting surface (i.e., the ground 26 in FIGS. 2 and 3).

As shown in FIG. 10, in the illustrative embodiment, the lifting mechanisms 22 at each end of the plow blade 12 connect through signal wires 114 travelling through the plow harness or otherwise to the control unit 78 in the cab of the truck. This would primarily allow for override, or for fine-tuning, of the otherwise automatic function of this portion of the device.

In the illustrative embodiment, each actuator or lifting mechanism 22 controls the orientation of the plow blade 12 of the snow plow device by lifting one end of the plow blade 12 so as to avoid damaging the boundary feature and/or obstruction disposed at the periphery of the area being plowed (e.g., to avoid damaging the grass 28 at the parking lot boundary in FIG. 3). As shown in the illustrative embodiment of FIGS. 2 and 3, a respective wheel 24 is disposed below, and connected to each actuator 22, and each actuator 22 and associated wheel 24 are disposed proximate to the one end of the plow blade 12. In the illustrative embodiment, the wheel 24 may include a tire. In alternative embodiments, a skid may be used rather than the wheel 24.

As illustrated in FIG. 3, the plow blade 12 is being raised at one end on the wheel 24 while the other end is on the supporting surface 26 or similarly raised upon a wheel 24. This is accomplished by the actuator or lifting mechanism 22, which is electrically motorized or hydraulic ram driven, and attached to the wheel 24 and operates independently from the actuator or lifting mechanism 22 at the opposite end of the plow blade 12. Also illustrated in FIG. 3 is the signal cable 30 buried under grass 28 emitting the appropriate signal, which is picked up by the receiver 20 mounted on the plow blade 12 resulting in the raising of the proximate end of the plow blade 12 to mitigate damage.

In FIG. 1A, a straight non-articulated plow blade assembly 10 that includes an inboard vertical orientation mechanism is illustrated. Referring to this figure, the hydraulic actuators 14 may be configured to control the orientation of the plow blade 12 by alternately lifting the respective ipsilateral corners of the plow blade 12 so as to avoid damaging the boundary feature and/or obstruction disposed at the periphery of the area being plowed. They may work in conjunction with hydraulic actuator 15, of which there are many configurations including the one illustrated, which raises and lowers the entire plow blade 12.

Figure 1B:
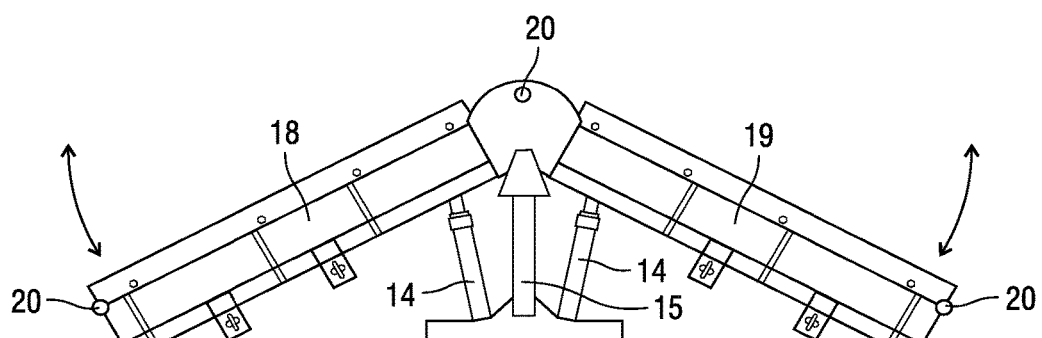
FIG. 1B is a top plan view of another snow plow device with receiver antennae at each end of an articulated plow blade as well as a receiver antenna at the middle portion of the blade, according to another illustrative embodiment of the plow collateral damage mitigating system.

In FIG. 1B, an articulated plow blade assembly 16 that includes an inboard vertical orientation mechanism is illustrated. Referring to this figure, the hydraulic actuator 15 controls the orientation of the first and second plow blade sections 18, 19 of the snow plow device by lifting the entire plow blade 18, 19 so as to avoid damaging the boundary feature and/or obstruction disposed at the periphery of the area being plowed.

By means of the hydraulic actuators 14, the inboard vertical orientation mechanism depicted in FIG. 1A has the effect of alternately or simultaneously raising or lowering respective ipsilateral corners of the straight plow blade 12. The hydraulic actuators 14 in FIGS. 1A and 1B may be part of, or function in concert with, the hydraulic lift system 15 commonly employed on snowplows.

Also, as shown in FIGS. 1A and 1B, the receivers of the plow collateral damage mitigating system may be in form of receiver antennas 20 mounted on top of the plow blade 12 proximate to the ends of the plow blade 12, and in the middle of the plow blade 12. The receiver antennas 20 are configured to wirelessly receive the at least one signal conveyed by the at least one signal wire of the signal transmission cable 30.

2. Transverse Plane Orientation Mechanisms

Referring again to FIGS. 1A and 1B, the transverse plane orientation mechanisms of the straight non-articulated plow blade assembly 10 and the articulated plow blade assembly 16 will now be described. In FIG. 1A, the hydraulic actuators 14 are able to control the orientation of the plow blade 12 of the straight non-articulated plow blade assembly 10 by rotating the entire plow blade 12 in a transverse plane so as to avoid damaging the boundary feature and/or obstruction disposed at the periphery of the area being plowed. Similarly, in FIG. 1B, the hydraulic actuators 14 are able to control the orientation of the first and second plow blade sections 18, 19 of the articulated plow blade assembly 16 by rotating the first and second plow blade sections 18, 19 in a transverse plane so as to avoid damaging the boundary feature and/or obstruction disposed at the periphery of the area being plowed.

In the illustrative embodiment, functioning through the existing hydraulic system of the plow blade assembly 10, 16, the receivers 20 mounted upon the plow blade 12 or plow blade 18, 19 pick up the signal from the perimeter control devices (i.e., signal transmission cable 30 and signal transmitter 32) which are analyzed within the control unit 78 effecting pivoting changes to the blade 12 or blade 18, 19 turning it either clockwise or counterclockwise relative to the border or boundary of the plow surface in order to allow for orientation parallel with the boundary obstructions and hazards (e.g., as shown in FIGS. 11A-11C). The degree to which blade parallelism with boundary linearity is accomplished through this mechanism is roughly proportionate to the angle at which the blade 12 or blade 18, 19 is approaching the boundary. Therefore, if the blade 12 or blade 18, 19 is moving tangential to the boundary, there will be no effect on the transverse plane blade positioning. However, if the blade 12 or blade 18, 19 is approaching the boundary or obstacle at a more acute angle, this mechanism is progressively engaged.

3. Perimeter Control Devices

Figure 4:
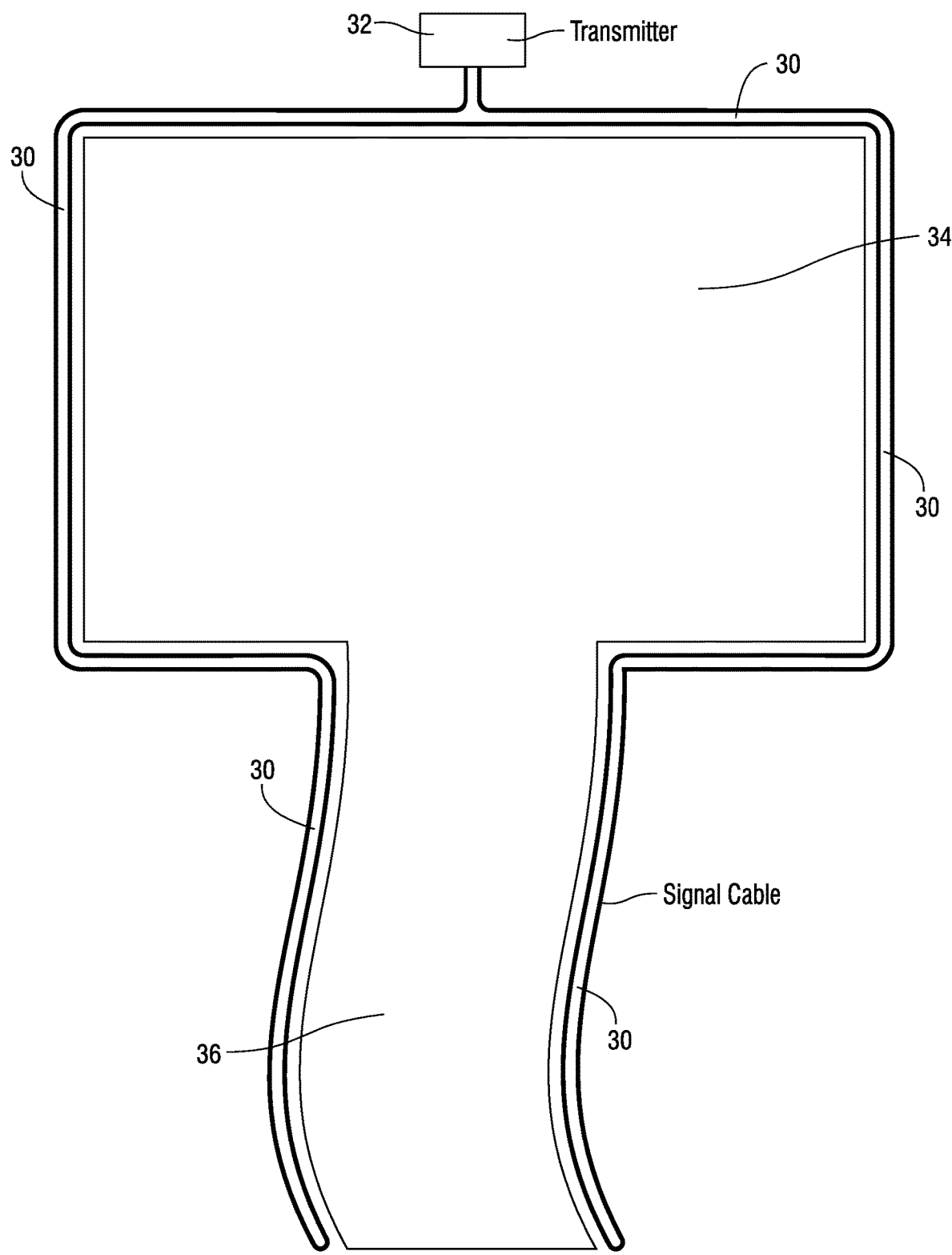
FIG. 4 is a top plan view illustrating the disposition of a signal cable around an area to be plowed, according to one illustrative embodiment of the plow collateral damage mitigating system.

With combined reference to FIGS. 4 and 5, it can be seen that perimeter control devices include a transmitter 32 operating at variable signal strengths and frequencies, which is connected to a power source and also to at least one portion of signal cable 30 with a signal wire of variable gauge and length positioned at or near the perimeter of the area to be plowed. Multiple signal wires and frequencies may be available and necessary depending upon the specific application in order to influence plow orientation, position, or elevation above the supporting surface, with the magnitude and velocity of lift dictated by the nature of any surrounding hazards, obstructions or landscape characteristics. Normally the signal wire is buried in order to prevent damage. The signal wire may be of multiple individual portions, possibly connected or bundled together in cross sectional fashion (see e.g., FIG. 6), with electromagnetic field (EMF) blocking external sheathing 70 (see FIG. 7) which may be color-coded depending upon the parameters of the various perimeter features to be protected. The sheathing 70 is torn away as the cable 30 is buried during installation, at intermittent locations and in segments of variable length, as necessary, in order to allow for adaptation to perimeter conditions as they linearly present. For example, with regard to the cable sheathing 70, the color code brown may be for perimeter dirt, green for perimeter grass, yellow for obstructions of curb height, and red for obstructions of substantially greater than curb height. Depending upon the individual signals transmitted within the cable 30, more than one signal wire may be exposed by removal of the external sheathing material 70 in order to induce multiple effects upon the plow blade mechanism. Not excluded is the possibility of, depending upon circumstances, any available aboveground perimeter signaling devices as well. Ultimately, the signals emitted by the transmitter 32 are picked up by receivers 20 mounted at both ends of the plow blade 12 and also in the middle of the plow blade 12.

FIG. 4 illustrates the disposition of the cable 30 around an exemplary area to be plowed (i.e., a parking area 34 with a driveway 36). In FIG. 4, it can be seen that the driveway 36 is curving whereas the parking area 34 is rectangular. A transmitter 32 is attached to the signal cable 30 that surrounds the periphery of the parking area 34 and driveway 36.

An illustrative embodiment of the signal transmission cable 30 used in the plow collateral damage mitigating system is illustrated in FIGS. 6 and 7. The signal transmission cable 30 is configurable so as to allow variable electromagnetic field emission along a length thereof. The signal transmission cable 30 is suitable for both aboveground and underground usage. As shown in the cross-sectional view of FIG. 7, each single signal transmission cable 56 in the cable bundle of FIG. 6 generally comprises at least one inner signal wire 64, the at least one inner signal wire 64 configured to convey a signal originating from the signal transmitter 32; a shielding layer 68 circumscribing the at least one inner signal wire 64, the shielding layer 68 configured to prevent an electromagnetic field (EMF) from escaping exteriorly from the signal transmission cable 56; and an outer protective layer 70 circumscribing the shielding layer 68, the outer protective layer 70 configured to prevent damage to the shielding layer 68 and the at least one inner signal wire 64. One or more portions of the outer protective layer 70 and the shielding layer 68 are configured to be selectively removed by a user so as to enable the electromagnetic field emanating from the signal transmission cable 56 to be varied. That is, the signal transmission cable 56 is capable of being modified to allow intermittently variable EMF transmission along its length. In the illustrative embodiment, the signal transmission cable 56 may further comprise an intermediate insulation layer 66 disposed between the shielding layer 68 and the at least one inner signal wire 64.

As shown in the cross-sectional view of FIG. 7, a central wire 64 of variable gauge is surrounded by plastic insulation 66 with the next layer being an appropriate EMS blocking material 68, such as aluminum, followed by an outer layer of durable in-ground sheathing material 70. Also illustrated at 12 o'clock and 3 o'clock positions are representative detents 58 enabling the longitudinal removal of the outer two layers 68, 70 in segments, as necessary, during installation.

As shown in the illustrative embodiment of FIG. 6, the single signal transmission cable 56 may be arranged in a helical bundle forming a composite signal transmission cable 30 so that exposed signal wire electromagnetic field emissions are not significantly blocked by adjacent intact portions of the outer protective layer 70 and the shielding layer 68. In FIG. 6, it can be seen that the helical cable bundle may comprise one or more interconnecting struts 62 for maintaining respective cables 56 of the cable bundle in a constant cross-sectional position relative to one another. Also, in the illustrative embodiment, the interconnecting radially disposed struts or cross members 62 are longitudinally shaped in a twisting fashion to allow for a helical disposition of the wires relative to one another (see FIG. 6). In the illustrative embodiment, the interconnecting struts 62 may be formed from a durable plastic material. In one or more embodiments, the outer protective layer 70 of the signal transmission cable 56 may be continuous with the radially disposed interconnecting struts 62, which maintain the spatial relationship of the various components. In other words, the interconnecting struts 62 may be formed together with the outer protective layer 70.

In FIG. 6, an exemplary four-signal wire composite signal transmission cable 30 is illustrated. In this illustrative example, each component signal wire is attached to the other wires via struts 62 made from an underground durable material (e.g., a suitable polymeric material or plastic). As will be described in detail hereinafter, perforations 58 facilitate the removal of the outer portion of the underground plastic shield 70 and its aluminum inner layer 68, of variable linearity, along with tabs 60 for tearing away these same two layers 68, 70, are illustrated. Also illustrated is the helical nature of the cable 30 rotating on its long axis.

Now, referring again to the cross-sectional view of FIG. 7, the illustrative embodiment of the single signal transmission cable 56 will be described in further detail. In the illustrative embodiment, the inner signal wire 64 of the signal transmission cable 56 comprises copper. More specifically, the signal wire 64 may be made from variably-gauged copper surrounded by the insulation layer 66. The insulation layer 66 may be formed from plastic, and be of underground-durable quality. In other embodiments, rather than including a single signal wire 64, the signal transmission cable 56 may comprise a plurality of inner signal wires 64, wherein the plurality of inner signal wires 64 are circumscribed by the shielding layer 68. In these other embodiments, each of the inner signal wires 64 may be radially disposed and axially connected to one another.

In the illustrative embodiment, the shielding layer 68 of the signal transmission cable 56 comprises a metallic material. As shown in FIG. 7, the signal blocking metallic shield 68 is layered immediately inside of the external underground plastic shield 70. The shielding layer 68 completely encircles the signal wire 64, thus blocking the electromagnetic field (EMF) from escaping exteriorly from the signal wire 64 of the signal transmission cable 56. In the illustrative embodiment, the metallic material of the shielding layer 68 is aluminum.

In the illustrative embodiment, the outer protective layer 70 of the signal transmission cable 56 comprises a polymeric material or plastic. As shown in FIG. 7, the external plastic shield 70 completely encircles the inner signal blocking metallic shield 68. In the illustrative embodiment, the outer protective layer 70 is attached to the shielding layer 68 such that, when the one or more portions of the outer protective layer 70 and the shielding layer 68 are removed by the user, the one or more removed portions of the outer protective layer 70 and the shielding layer 68 are removed from the signal transmission cable 56 together as a unit. Referring collectively to FIGS. 6 and 7, the outer protective layer 70 comprises a plurality of perforations 58 extending longitudinally along the length of the signal transmission cable 56. The plurality of perforations 58 facilitate a removal of the one or more portions of the outer protective layer 70 and the shielding layer 68 from the remainder of the signal transmission cable 56. That is, the outer portion of the shield 70, relative to the central axis of the cable 56, has optimally spaced perforations 58 that allow for removal of longitudinal segments of the outer portion of the shield 70 along with the signal blocking metallic shield 68 to expose the inner signal wire 64 and allow escape of the electromagnetic field (EMF). In FIGS. 6 and 7, it can be seen that the perforations 58 are circumferentially spaced apart from one another on the outer periphery of the outer protective layer 70 so as to define a removable strip of the outer protective layer 70 (see FIG. 6). In other embodiments, rather than perforations 58, the outer protective layer 70 may comprise lines of weakness or indents for facilitating a removal of the one or more portions of the outer protective layer 70 and the shielding layer 68 from the remainder of the signal transmission cable 56.

Turning again to the illustrative embodiment of FIG. 6, it can be seen that the outer protective layer 70 further comprises a plurality of tabs 60 that are configured to be grasped by a user so as to facilitate a removal of the one or more portions of the outer protective layer 70 and the shielding layer 68 from the remainder of the signal transmission cable 56. To facilitate this removal, these tabs 60 can be lifted, and the outer protective layer 70 is able to be torn in a longitudinal direction to the desired length.

In the illustrative embodiment, the signal transmission cable 56 is omnidirectional with variable longitudinal EMF emission capabilities, which allows for automatic adaptation of the plow device depending upon perimeter hazards and obstructions. The transmitter 32 emits variable EMF along one or more wires 64, which are then allowed to pass to the plow device to influence its actions based upon perimeter conditions in conjunction with the selective removal of the outer EMF blocking sheath 70 and the shielding layer 68 along certain portions of the cable 56 at the time of in-ground installation. The illustrated tabs 60 allow for selective removal of the longitudinal sheath 70 and the shielding layer 68 along detents.

4. Control Module

Figure 9:
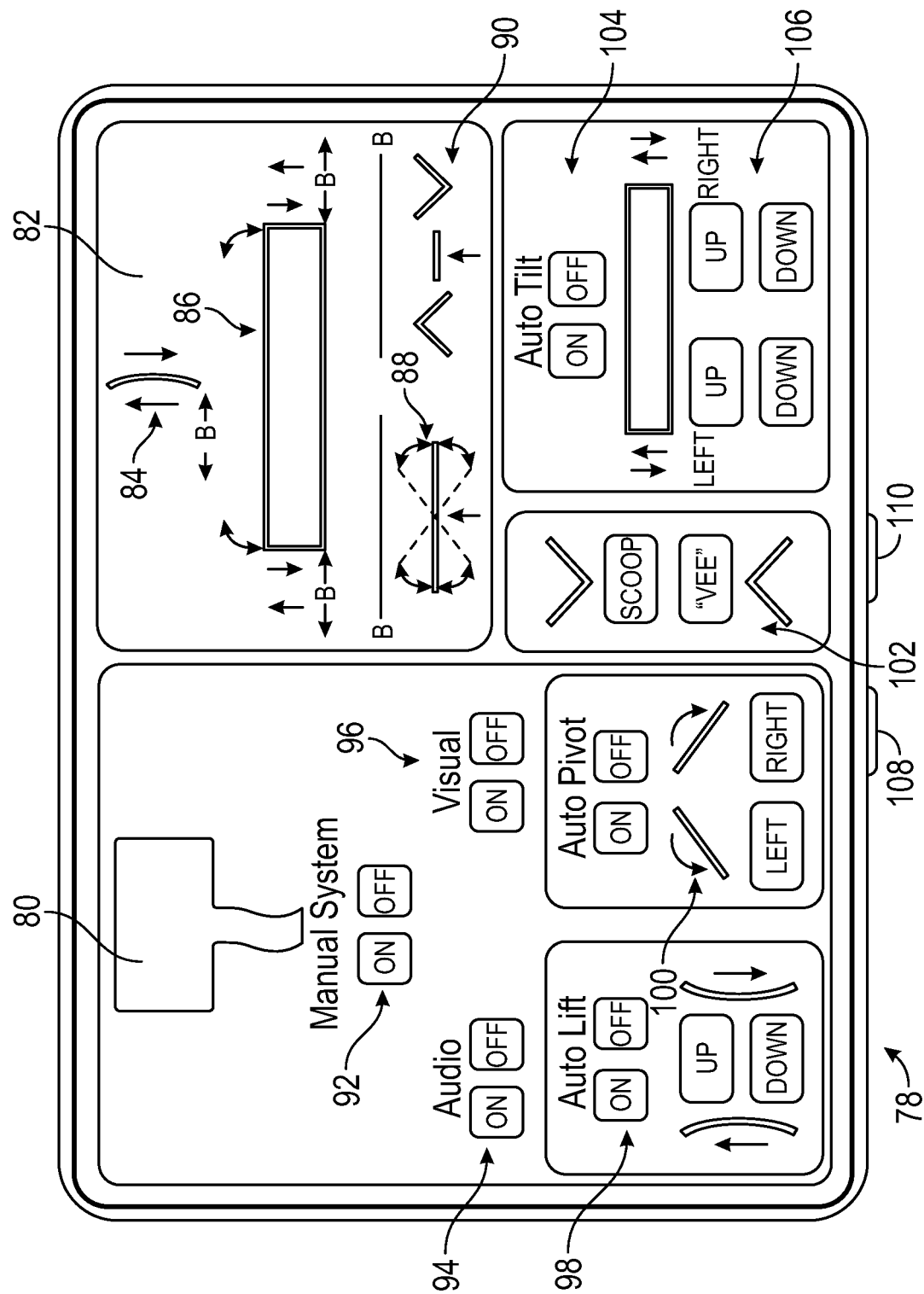
FIG. 9 is a representation of a display screen and control unit associated with one illustrative embodiment of the plow collateral damage mitigating system.

In the illustrative embodiment, with reference to FIG. 9, the plow collateral damage mitigating system comprises a control unit or control module 78 that is located in a cab of the vehicle on which the snow plow device is mounted. In the illustrative embodiment, the control module 78 performs monitoring and control functions for the system. More specifically, the control module 78 is where control of the hydraulics 14, 15 and all associated lift and manipulation mechanisms 22 are routed. Also, it is through this component 78 that the relative position of the plow versus the electronic boundary is visualized by the operator. Also visualized on the associated monitor, which may or may not be integral to the control module 78, may be color-coding or other visual cues associated with the cable 30 buried at the perimeter warning the operator as to the nature of proximate obstacles. In the illustrative embodiment, there also is the availability of an audio signal of variable volume, frequency and tone, which warns the driver of the proximity to any boundary obstruction or hazard near the surface to be cleared. As the receivers 20 detect increasing signal strength from the perimeter signal cables 30 and transmitter 32, interaction through the control module 78 calls for lifting of the plow blade off the supporting surface at the appropriate end (see FIG. 3), or both ends, or completely from the supporting surface, or transverse plane reorientation, as necessary. The control module 78 allows for active engagement or disengagement of any or all of the automatic functions associated with the current device. In the illustrative embodiment, there may also be a receptacle for a plug-in handheld plow controller.

As shown in FIG. 9, in the illustrative embodiment, the control unit 78 comprises a visual display device. The control unit may be configured to display a graphical representation of the site 80 being plowed in a first part of the visual display device. The control unit 78 may be further configured to display a graphical representation of the orientation of the plow blade of the snow plow device in a second part 82 of the visual display device. More specifically, as shown in FIG. 9, the second part 82 of the visual display device may contain a graphical representation of the plow end view 84, the plow top view 86, the plow degree of parallelism 88, and the shape 90 of the plow blade.

Referring again to the illustrative embodiment of FIG. 9, the control unit 78 may further comprise a plurality of control buttons 92, 94, 96, 98, 100, 102, 104, 106 for controlling the functionality of the plow blade of the snow plow device. For example, as shown in FIG. 9, the control unit 78 may include manual on/off buttons 92 for activating and deactivating manual operation of the system, audio on/off buttons 94 for activating and deactivating audial cues for the operator, and visual on/off buttons 96 for activating and deactivating visual cues for the operator. Also, it can be seen that the control unit 78 may further comprise a cluster of auto lift buttons 98, which include auto lift on/off buttons for activating and deactivating the auto lift operation of the snow plow device, and up/down buttons for manually raising and lowering the plow blade when the auto lift operational feature is turned off. Also, as shown in FIG. 9, the control unit 78 may further comprise a cluster of auto pivot buttons 100, which include auto pivot on/off buttons for activating and deactivating the auto pivot operation of the snow plow device, and left/right buttons for manually pivoting the plow blade when the auto pivot operational feature is turned off. In addition, the control unit 78 of FIG. 9 may further comprise plow shape button 102 for allowing the operator of the snow plow device to select either a scoop or "vee" shape for the plow blade. Finally, as shown in FIG. 9, the control unit 78 may further comprise a cluster of auto tilt buttons, which include auto tilt on/off buttons 104 for activating and deactivating the auto tilt operation of the snow plow device, and two sets of up/down buttons 106 for manually raising and lowering each of the opposed ends of the plow blade when the auto tilt operational feature is turned off.

In the illustrative embodiment, the visual display device or display screen of the control unit 78 may depict the plow blade 12 and its associated orientation as it relates to distance from the perimeter hazard as detected by the receiver 20 at either end of the plow 12, and the middle of the blade 12 as well. One portion of the screen may illustrate a representation of the plow 12 as it approaches a border with the end of the plow nearest the hazard progressively raised. Another portion of the screen may contain a representation of the plow 12 as it approaches a border hazard head on. The closer the blade comes to the perimeter hazard, the more it is elevated. Yet another portion of the screen may display a representation of the degree of parallelism, or lack thereof, of the blade 12 versus the boundary hazards or obstructions as demarcated by the cable 30 and associated signal being emitted therefrom. Yet another portion of the screen may indicate the shape of the plow blade as it approaches the border, whether scoop, V, or straight (see e.g., the shape 90 of the plow blade in FIG. 9). Control buttons and/or rocker switches are conveniently positioned below, to the side, or separately from, the display to allow for manipulation of the plow blade including selectively raising the left end of the blade, completely elevating or lowering the blade, changing the articulation of the blade, pivoting the blade from left to center to right, or selectively raising or lowering the right end of the blade (see e.g., control buttons 98, 100, 102, 104, 106 in FIG. 9). Also, switches allow for override of the mechanism, visual aid, audio aid, auto pivot, auto lift, V or scoop reshaping of the blade, and auto tilt or border-guard functions (see e.g., control buttons 92, 94, 96, 98, 100, 102, 104, 106 in FIG. 9). Also, due to the nature of signal 72 received by the antennae 20 mounted on the blade 12, the type of expected proximate obstruction or hazard may be displayed.

Turning again to the illustrative embodiment of FIG. 9, it can be seen that the control unit 78 may further comprises a harness plug-in port 108 for connecting to the wire harness of the snow plow device, and a handheld plug-in port 110 for connecting to a handheld plow controller.

In the illustrative embodiment, the control unit 78 of the plow collateral damage mitigating system is configured to operate both in a first automatic mode where the orientation of the plow blade of the snow plow device is controlled based upon the at least one signal of the signal transmission cable 30, and in a second manual override mode where the orientation of the plow blade of the snow plow device is able to be manually adjusted by an operator of the snow plow device (e.g., by selecting the "on" button of the manual system buttons 92 in FIG. 9).

Also, in the illustrative embodiment, the control unit 78 may be configured to identify the area that is to be plowed by Global Positioning System (GPS) coordinates of the area, to "learn" the shape of the area to be cleared of snow, and to display a graphical representation thereof on the visual display device (e.g., the graphical representation of the site 80 in FIG. 9).

Further, in the illustrative embodiment, the plow collateral damage mitigating system comprises a video output device (e.g., the visual display 80, 82 described above) configured to display at least one visual cue to the operator of the snow plow device regarding the boundary feature and/or obstruction disposed at the periphery of the area being plowed (e.g., the graphical representation of the site 80 in FIG. 9, which may also include a graphical representation of the plow device). Also, in the illustrative embodiment, the plow collateral damage mitigating system also comprises an audio-based output device configured to transmit at least one audial cue to an operator of the snow plow device regarding the boundary feature and/or obstruction disposed at the periphery of the area being plowed (e.g., the audial cues may be activated and deactivated by the audio on/off buttons 94 described above). In the illustrative embodiment, the control unit 78 is further configured to direct the video output device to display the at least one visual cue and/or the audio-based output device to transmit the at least one audial cue based upon the at least one signal of the signal transmission cable 30 so as to prevent the operator from damaging the boundary feature and/or obstruction disposed at the periphery of the area with the snow plow device. More specifically, in the illustrative embodiment, the control unit 78 is further configured to generate and display a graphical representation of the snow plow device and the area that is to be plowed on the visual display device to visually notify the operator as to the proximity of a plow blade of the snow plow device to the boundary feature and/or obstruction (e.g., the graphical representation of the site 80 in FIG. 9, which may also include a graphical representation of the plow device).

In the illustrative embodiment, the audio-based output device comprises a speaker device, and the control unit 78 is further configured to emit a sound of variable volume, frequency and/or tone from the speaker to audibly notify the operator as to the proximity of a plow blade of the snow plow device to the boundary feature and/or obstruction (e.g., the audial cues from the speaker may be activated and deactivated by the audio on/off buttons 94 of the control unit 78).

5. System Connections

In the illustrative embodiment, with reference to FIGS. 5 and 10, the perimeter control transmitter 32 is connected to the perimeter boundary cable 30, which is buried in-ground near the surface to be plowed. The signal wire(s) 64 of the perimeter boundary cable 30 serve as the transmission antennae for signals of varying strength and frequency which are picked-up by the receivers 20 mounted upon the plow blade 12 or 18, 19. The receivers 20 are connected via signal wire 112 running through the harness of the plow mechanism, which is connected to the monitor and control module 78 in the cab of the truck (see FIG. 10). The control module 78 in the cab is connected by signal wire 114 within the plow harness to the hydraulic or other mechanisms 22 in place to manipulate the plow (see FIG. 10).

6. System Functionality

With the current plow collateral damage mitigating system in its illustrative embodiment, and receiving appropriate signals from the boundary transmitting devices, the plow approaches the underground marking signal wires of cable 30 from which a predetermined boundary/obstruction/site-specific signal emanates, and is received at either end and/or the middle of the plow by receiver antennas 20 (see e.g., FIGS. 8A, 8B, and 11A-11C). If tangential to a boundary hazard of lower height, such as along a driveway bordered by grass or dirt, the appropriate end of the plow is raised by the vertical orientation mechanism displacing weight from the edge and corner of the plow nearer the signal wire, thus sparing the soft hazard from damage (see e.g., FIG. 3). Visualized on the screen in the cab of the vehicle, and with optional audio signal, would be the orientation of the blade and relative position to the boundary marker (see FIG. 9). This aids the driver in steering away from the hazard. The reaction of the plow mechanism is usually predetermined during set up of the current system as the signal wire is laid down in the ground, and as dictated by the perimeter conditions and hazards.

In FIG. 5, a diagram depicting an exemplary work site with various perimeter hazards is illustrated. The perimeter hazards in FIG. 5 include dirt 38, grass 40 with a curb obstruction 42, grass 44 without a curb obstruction, and rocks 46. FIG. 5 also represents the different signals 48, 50, 52, 54 emitted from each segment of the signal cable 30, in order to trigger a different reaction from the current system, based on the particular perimeter hazard. More specifically, as shown in FIG. 5, when the perimeter hazard is dirt 38, the signal cable 30 emits a first signal type 48. When the perimeter hazard is grass 40 with a curb obstruction 42, the signal cable 30 emits a second signal type 50. When the perimeter hazard is grass 44 without a curb obstruction, the signal cable 30 emits a third signal type 52. Finally, when the perimeter hazard is rocks 46, the signal cable 30 emits a fourth signal type 54. As such, in the illustrative embodiment, the plow collateral damage mitigating system is able to inform the plow operator as to the particular type of perimeter hazard encountered.

Figure 8A:
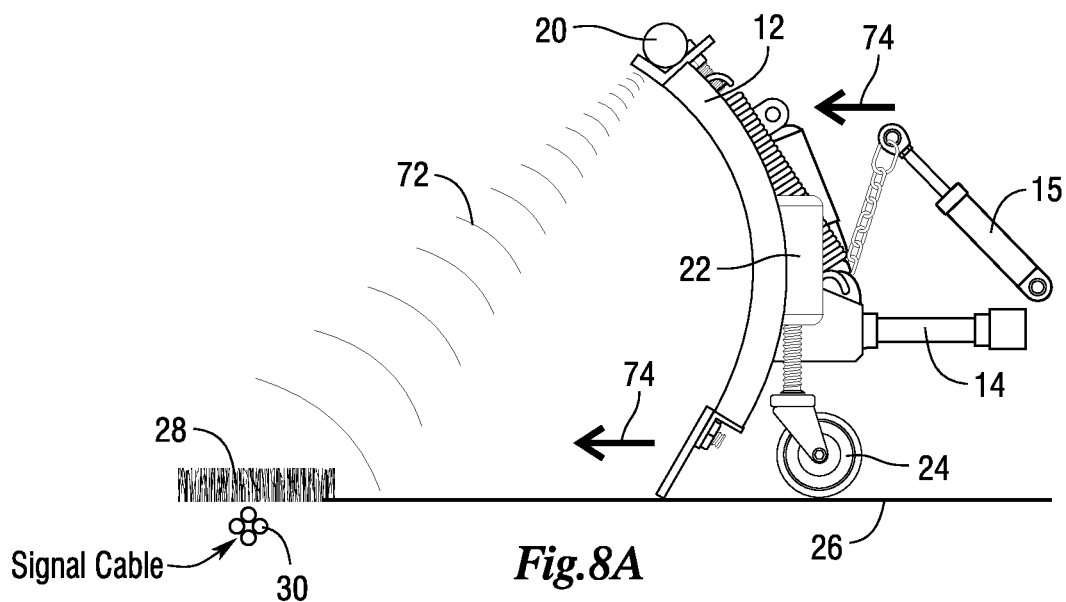
FIG. 8A is a side view of a plow blade approaching an area of grass under which is buried an omnidirectional signal cable from which is emitted a signal, according to one illustrative embodiment of the plow collateral damage mitigating system.
Figure 8B:
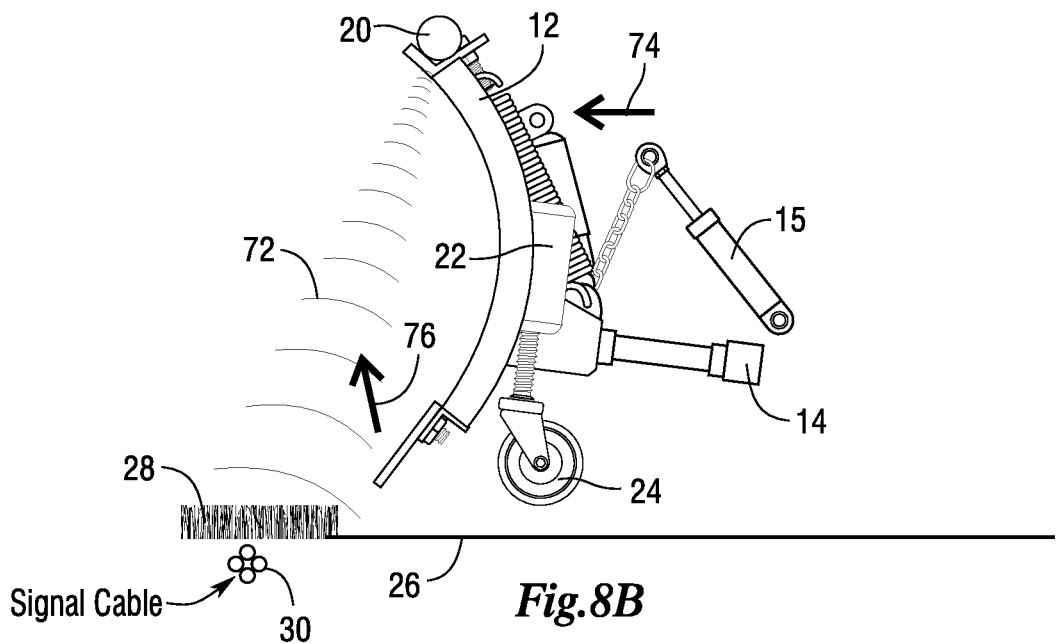
FIG. 8B is another side view of a plow blade of FIG. 8A, wherein, as the plow blade approaches the signal cable at approximately a 90° angle, the plow blade is lifted by a hydraulic mechanism in order to avoid damaging the grass.

In FIG. 8A, a plow blade 12 is approaching an area of grass 28 under which is buried an omnidirectional signal cable 30 from which is emitted a signal 72. The arrow 74 diagrammatically represents the direction of travel of the plow blade 12 in FIG. 8A. In FIG. 8B, as the plow blade 12 approaches the signal cable 30 at approximately a 90o angle, the plow blade 12 is lifted by a hydraulic mechanism 22 and/or hydraulic actuator 15 in order to avoid damaging the grass 28. The arrow 76 diagrammatically represents the lifting of the plow blade 12 in FIG. 8B. In FIGS. 8A and 8B, the receiver 20 of the signal 72 is at the upper portion of the plow blade 12.

On the other hand, if the plow 12 is being operated in an area where the approach to the boundary or hazard is generally more acute and closer to a 90o angle, and perhaps there is a hazard such as a curb 122 (e.g., as shown FIG. 11C), a different signal will be emanating from the previously selected (at the time of installation) perimeter signal wire resulting in raising of the entire plow blade by the inboard vertical orientation mechanism via the hydraulic system of the plow in order to clear the obstruction. Operation in this mode results in the plow blade 12 being raised so as to clear any boundary obstruction without causing damage to the equipment and/or hazard. Again, as visualized on the screen in the cab, the orientation of the blade 12 relative to the boundary can be monitored in order to mitigate collateral damage. Also operational is the transverse plane orientation mechanism, which will make the plow blade 12 closer to parallel with the boundary or hazard mitigating damage to, or from, either corner of the blade (see FIG. 11C).

One exemplary approach of the plow blade 12 to a boundary hazard (e.g., a curb 122) is illustrated in FIGS. 11A-11C. Initially, FIG. 11A illustrates a vehicle 116 with a plow 12 mounted thereon in a first stage of action with an oblique approach angle to the boundary curb 122. The directional arrow 118 diagrammatically represents the direction of travel of the vehicle 116, while the directional arrow 120 diagrammatically represents the direction of travel of the plow 12. In FIG. 11A, it can be seen that the signal 72 emanating from the signal transmission cable 30 along the boundary curb 122 is received by the receiver antennas 20 on the ends, and in the middle of the plow 12. FIG. 11B illustrates the vehicle 116 with the plow 12 mounted thereon in a second stage of action where the "squaring up" of the plow device 12 has begun (e.g., as diagrammatically indicated by the curved arrow 120). FIG. 11C illustrates the vehicle 116 with the plow 12 mounted thereon in a third stage of action depicting the resulting "squaring up" or parallelism resulting from automatic re-orientation to minimize damage from, in this case, the driver's side bottom corner of the blade 12 to the bordering grass and curb 122.

As a result of function within the logic circuit within the control module 78 and possibly via triangulation, the position of the plow blade 12 and its approach to the boundary can be analyzed for either tangential function or more acute angle orientation. This then has influence upon whether or not one end of the plow 12 or the other is raised, the entire blade 12 is raised by the hydraulic system and/or whether the blade 12 will be reoriented to be more parallel with the boundary. When approaching an area of signal transition from that indicating a low lying hazard to a higher obstruction such as a curb, the mechanism will generally default to reaction to the signal indicating the more substantial obstacle resulting in the appropriate elevation of the blade 12 from the supporting surface.

The illustrative embodiment also allows for loading of site-specific information into memory of the on-board control module 78 associated with the visualization screen with Global Positioning System (GPS) associated identification of the work site. This aids the operator with varying site-specific visualization of the work site layout and hazards (see e.g., the graphical representation of the site 80 in FIG. 9).

With the current system in its illustrative embodiment and receiving appropriate signals from the boundary transmitter 32, as the plow 12 approaches the obstruction/hazard/perimeter-marking signal wires in cable 30 (or other appropriate above-ground boundary marking system) from which the appropriate variable signal emanates and is received at either end and/or the middle of the snowplow 12 by the receiver antennas 20, the plow 12 is automatically manipulated and may be fine-tuned by the operator. The operator would actively lower the blade 12 for the next pass.

The illustrative embodiment allows for otherwise normal operation of the plow 12 moving at any angle to the electronically imposed boundary. For instance, if while plowing along a driveway the operator approaches too close to one side or the other, that particular portion of the plow 12 will be raised while the other end generally will not (e.g., as shown in FIG. 3). However, with variable signal strength and frequency from the perimeter control system, there may be incremental elevation of either end of the plow via the outboard vertical orientation mechanism 22 depending upon set-up of the device. Elevation of the plow blade 12 is variable at either end when taking into consideration the width of the plow 12, angle of the plow 12 relative to the perimeter of the surface to be plowed as marked by the perimeter control mechanism, direction of travel of the plow vehicle, the degree of angulation of an articulated blade 12 and characteristics and contours of the surrounding perimeter areas. Once the plow receivers 20 are back within the boundary perimeter, the outboard vertical orientation mechanism 22 cause(s) retraction of the outboard wheel at either or both ends of the plow blade 12.

The amount of elevation of either end of the plow, or the entire plow itself, or transverse plane reorientation of the blade 12, as well as the degree of buffer zone at the perimeter of the surface to be plowed and its effect upon vertical and transverse plane positioning of the plow as dictated by the perimeter control mechanism, would be infinitely variable, site-specific and stored within the memory of the cab control module 78 so that the overall operation of the device would be location-specific without any input necessary on the part of the plow operator after initial set-up and programming. In other words, the control module 78 of the plow collateral damage mitigating system is capable of being preprogrammed with variable boundary, hazard or obstruction-related plow blade control. For instance, the site to be plowed would simply be identified within the plow control module 78 via GPS coordinates, location of the module itself or the cell phone of the plow operator. The system would then be left in place and untouched from year-to-year allowing for increased efficiency and profit on the part of the plow operator. The system would likely be proprietary and offer advantages to both the manufacturer of the snowplow and associated systems as well as be beneficial for repeat year-to-year servicing of the site by the owner of that certain make of plow. The property owner benefits from the current device due to minimized collateral damage during snowfall season.

The screen on the control module 78 in the cab of the snowplow allows visualization of the electronic boundaries, hazards, obstructions and relative position of the plow and vehicle. This particularly facilitates the movement of the plow parallel or tangential to any features, which are to be avoided, particularly with a curved or complex driving area.

7. Intermittently/Variably Illuminated Plow Positional Indicator Mast

In a further embodiment, the plow collateral damage mitigating system includes an intermittently/variably illuminated plow positional indicator mast that aids in the monitoring of the relative position of a plow blade with respect to a boundary of a surface to be cleared of snow, as demarcated by an appropriate signal originating from a transmitter attached to, and emanating from, a signal wire or other appropriate above-ground or in-ground source at a boundary of an area to be serviced.

In this further embodiment, the intermittently/variably illuminated plow positional indicator mast is mounted in an appropriate location upon a plow assembly in order to be visible by a plow operator and function to aid an operator in monitoring the position of a plow blade in relation to a boundary of a surface to be cleared of snow. Advantageously, the intermittently/variably illuminated plow positional indicator mast is to provide the plow operator with visual assistance concerning positional orientation of the plow blade relative to a boundary while looking ahead through the windshield of a plow vehicle. These visual cues supplement, as desired, audial and visual cues provided through any other associated mechanism and/or heads-up display. The plow positional indicator mast also may be configured to give a plow operator information concerning the nature of any hazards adjacent to, or beyond, the boundary of a surface upon which a plow blade assembly is being employed.

Prior to describing the illustrative embodiment of this feature of the plow collateral damage mitigating system, various objects of the intermittently/variably illuminated plow positional indicator mast will be described.

An object is to provide an intermittently/variably illuminated plow positional indicator mast, which may be mounted upon a plow or vehicle.

Another object is to provide an intermittently/variably illuminated plow positional indicator mast, which aids in determining position of a plow blade relative to a boundary.

Another object is to provide an intermittently/variably illuminated plow positional indicator mast, which receives an EMF signal from a signal wire at a boundary.

Another object is to provide an intermittently/variably illuminated plow positional indicator mast, which receives an EMF signal from a signal wire positioned at a boundary of a surface to be cleared of snow.

Another object is to provide an intermittently/variably illuminated plow positional indicator mast with lighted portions.

Another object is to provide an intermittently/variably illuminated plow positional indicator mast with a receiver portion.

Another object is to provide an intermittently/variably illuminated plow positional indicator mast responsive to an EMF signal.

Another object is to provide an intermittently/variably illuminated plow positional indicator mast capable of responding to multiple EMF signals.

Another object is to provide an intermittently/variably illuminated plow positional indicator mast capable of being calibrated to varying EMF signal(s).

Another object is to provide an intermittently/variably illuminated plow positional indicator mast with signal lights.

Another object is to provide an intermittently/variably illuminated plow positional indicator mast capable of producing different lighting effects in response to EMF signals and strength of signal.

Another object is to provide an intermittently/variably illuminated plow positional indicator mast capable of variable lighting effects depending upon EMF signal strengths.

Another object is to provide an intermittently/variably illuminated plow positional indicator mast capable of functioning in conjunction with a plow vehicle onboard control system.

Another object is to provide an intermittently/variably illuminated plow positional indicator mast capable of stand-alone functionality.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being call to the fact, however, that the drawings are illustrative only, and that changes may be made in the specific construction illustrated and described within the scope of this application.

Turning now descriptively to the drawings of the illustrative embodiment, in which similar reference characters denote similar elements throughout the views, the figures generally illustrate one or more embodiments of the intermittently/variably illuminated plow positional indicator mast 130 and its various components.

An illustrative embodiment of the intermittently/variably illuminated plow positional indicator mast will now be described with reference to FIGS. 4 and 12-17. As described above, FIG. 4 is a top view of parking area 34, driveway 36, and transmitter 32 connected to signal wire 30 disposed at the perimeter of a representative area to be cleared of snow. FIG. 12 is a side view of indicator mast assembly 130 mounted atop blade 12 of plow assembly 10.

FIG. 13 is a side view of indicator mast assembly 130. Receiver 20 is situated at the base of upright portion of indicator mast 132 of indicator mast assembly 130, and is connected via indicator mast point of attachment 131. Upright portion of indicator mast 132 is subdivided into soft boundary hazard subsection 132a and solid boundary hazard subsection 132b.

Figure 14A:
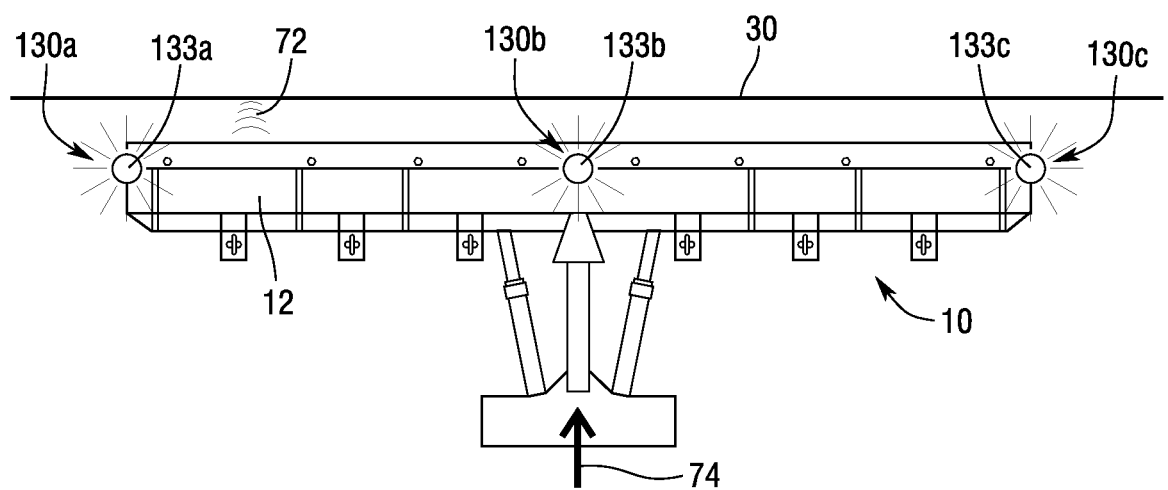
FIG. 14A is a top view of a straight plow blade of a plow assembly with an indicator mast assembly approaching a signal cable.

FIG. 14A is a top view of a straight plow blade 12 of plow assembly 10 approaching signal cable 30 as indicated by directional arrow 74. Indicator mast assemblies 130 are mounted atop plow blade 12 of plow assembly 10 with driver's end warning light portion 133a, center warning light portion 133b and passenger's end warning light portion 133c mounted atop driver's end indicator mast 130a, center indicator mast 130b and passenger's end indicator mast 130c, respectively. Each warning light portion is constantly illuminated.

Figure 14B:
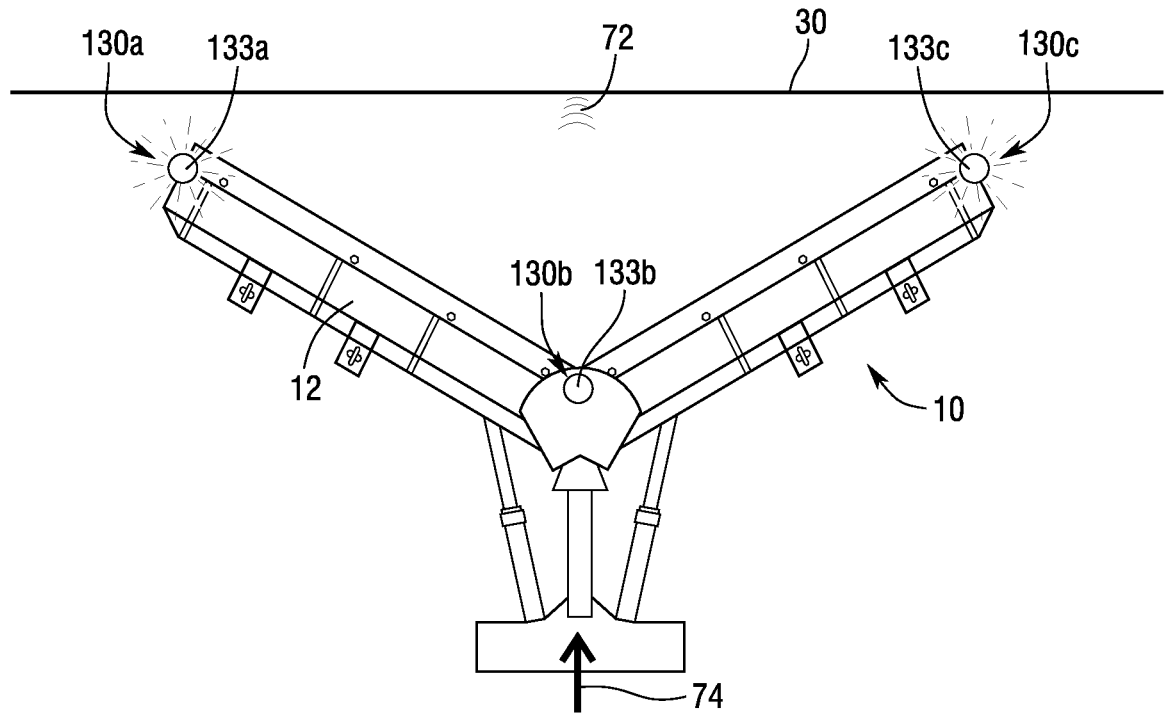
FIG. 14B is a top view of a scoop shape plow blade of a plow assembly with an indicator mast assembly approaching a signal cable.

FIG. 14B is a top view of a scoop shape plow blade 12 approaching signal cable 30 with driver's end warning light portion 133a and passenger's end warning light portion 133c illuminated and flashing at the same rate, while center warning light portion 133b is not illuminated, indicating greater distance from signal cable 30 than the more proximate ends of the plow.

Figure 14C:
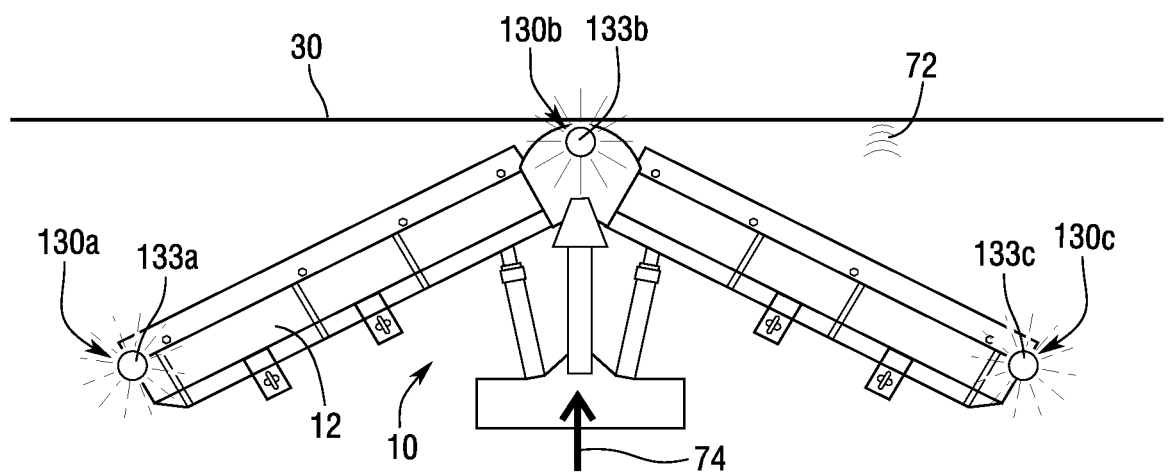
FIG. 14C is a top view of a V-shape plow blade of a plow assembly with an indicator mast assembly approaching a signal cable.

FIG. 14C is a top view of a V-shape plow blade 12 approaching signal cable 30. Center warning light portion 133b is constantly illuminated due to immediate juxtaposition to signal cable 30 as compared to driver's end warning light portion 133a and passenger's end warning light portion 133c, which are both flashing indicating increased relative distance from signal cable 30 and diminished signal 72 intensity at either end of plow blade 12.

Figure 14D:
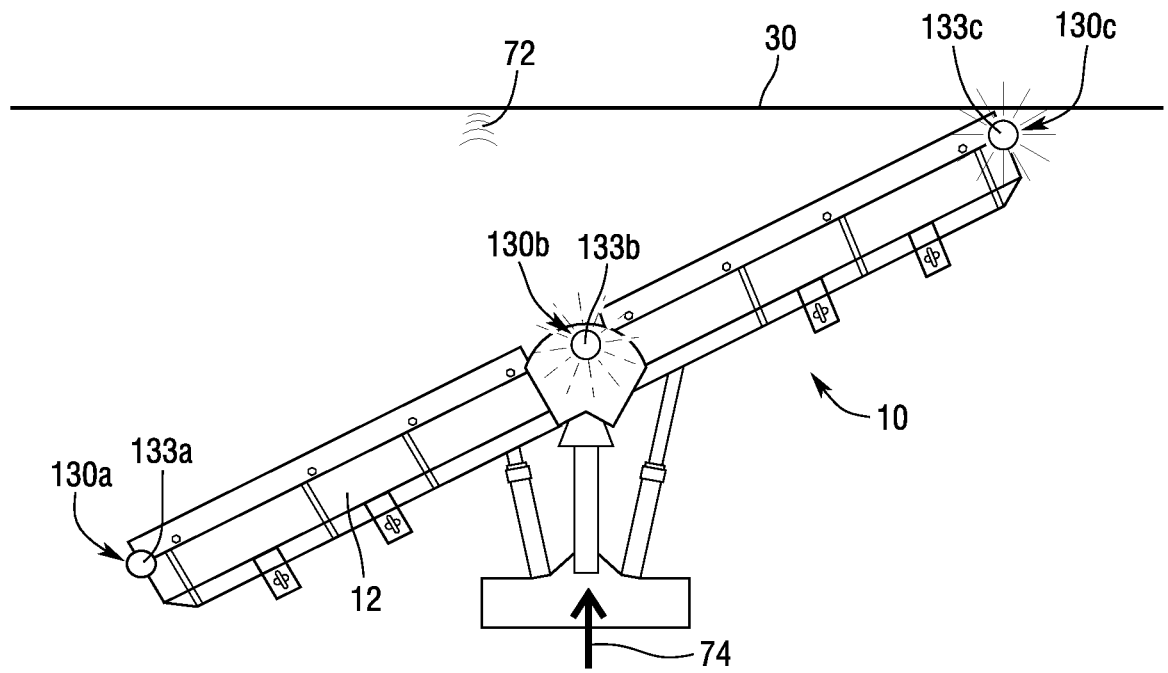
FIG. 14D is a top view of a straight plow blade of a plow assembly with an indicator mast assembly approaching a signal cable, wherein the straight plow blade has left angulation.

FIG. 14D is a top view of a straight plow blade 12 approaching signal cable 30 with left angulation. Driver's end warning light portion 133a is not illuminated due to increased distance from signal cable 30 and diminished intensity of signal 72. Passenger's end warning light portion 133c is constantly illuminated due to its immediate proximity to signal cable 30. Center warning light portion 133b is flashing due to its intermediate distance from signal cable 30 and intermediate strength of signal 72.

Figure 14E:
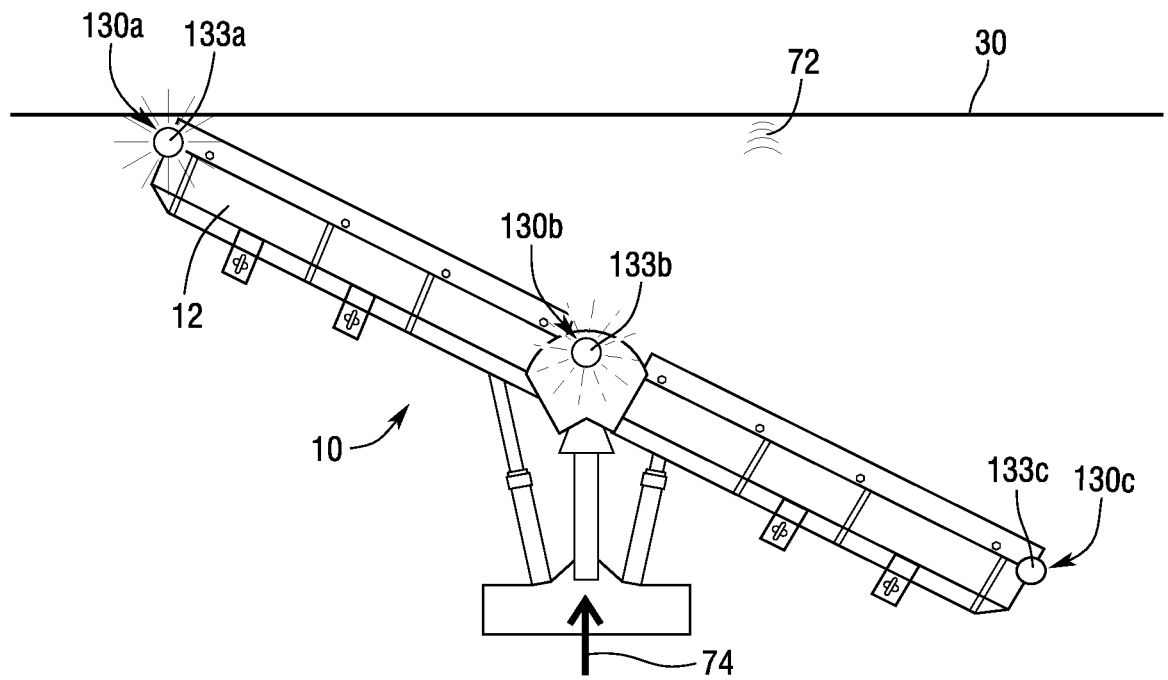
FIG. 14E is a top view of a straight plow blade of a plow assembly with an indicator mast assembly approaching a signal cable, wherein the straight plow blade has right angulation.

FIG. 14E is a top view of a straight plow blade 12 approaching signal cable 30 with right angulation. Driver's end warning light portion 133a is constantly illuminated due to its immediate proximity to signal cable 30 and high strength of signal 72. Passenger's end warning light portion 133c is not illuminated due to increased relative distance from signal cable 30 and relatively diminished intensity of signal 72. Center warning light portion 133b is flashing due to its intermediate distance from signal cable 30 and strength of signal 72.

Figure 15:
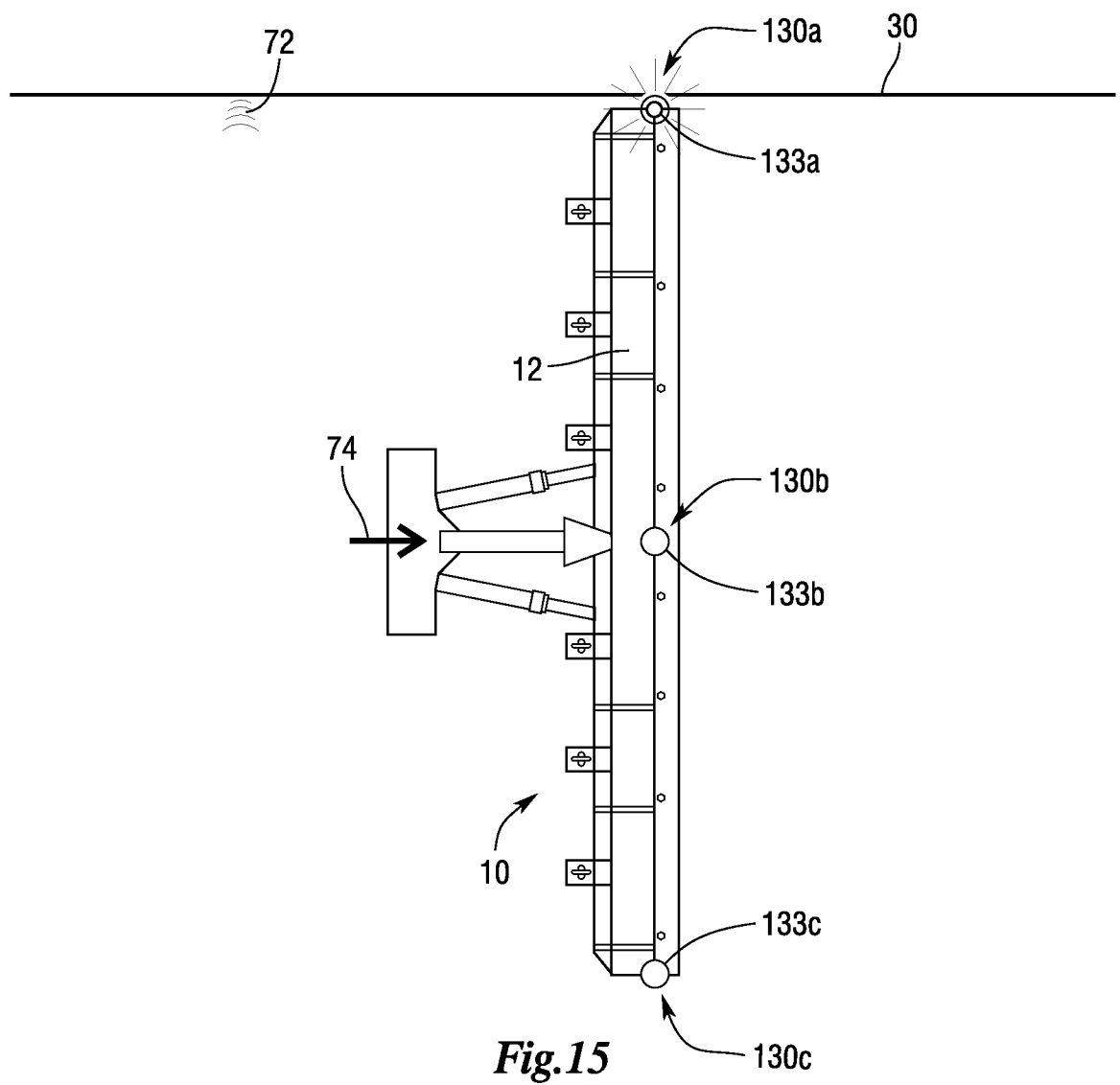
FIG. 15 is a top view of a plow blade of a plow assembly with an indicator mast assembly, wherein the plow blade is moving parallel and tangential to a signal cable.
Figure 16:
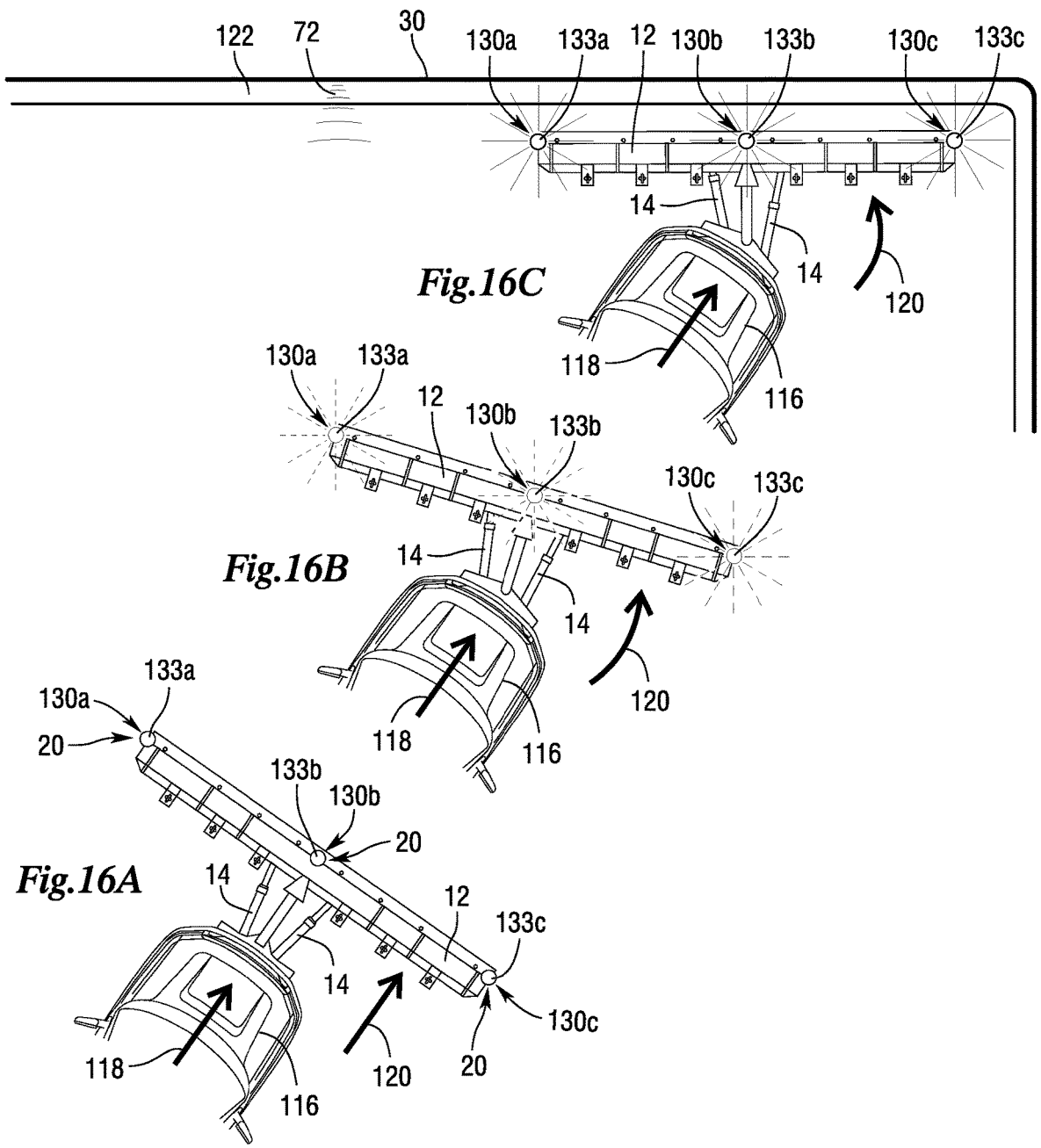
FIG. 16A is a top view of plow vehicle approaching a signal cable in a first stage of action, wherein a plow blade of the plow vehicle is oriented at approximately 350 relative to the signal cable and a boundary curb.
FIG. 16B is a top view of the plow vehicle approaching the signal cable in a second stage of action, wherein the plow vehicle approaches the signal cable at an angle of approximately 55°, with plow blade oriented at approximately 150 relative to the boundary.
FIG. 16C is a top view of the plow vehicle approaching the signal cable in a third stage of action, wherein the plow blade of the plow vehicle is oriented parallel relative to the signal cable.

FIG. 15 is a top view of plow blade 12 moving parallel and tangential to signal cable 30. Driver's end warning light portion 133a is constantly illuminated due to its immediate juxtaposition to signal cable 30, while center warning light portion 133b and passenger's end warning light portion 133c are, in this instance, calibrated to not be illuminated if one half plow width or more distant from signal cable 30 and signal 72.

FIG. 16A is a top view of plow vehicle 116 approaching signal cable 30 with plow blade 12 oriented at 350 relative to signal cable 30 and boundary curb 122. Due to relatively increased distance from signal cable 30 and low strength of signal 72, none of the warning light portions 133 are illuminated.

FIG. 16B is a top view of plow vehicle 116 approaching signal cable 30 at an angle of approximately 55°, with plow blade 12 oriented 35° relative to the boundary. As plow vehicle 116 approaches boundary curb 122, plow directional arrow 120 indicates a counterclockwise turning movement of plow blade 12 reorienting plow blade 12 to an angle of 15° relative to boundary curb 122. At the same time, warning light portions 133 are closer to signal cable 30 than in FIG. 16A and are reacting to increased strength of signal 72. Being closer in proximity to signal cable 30, driver's end warning light portion 133a is flashing at a greater frequency than center warning light portion 133b, which is in turn flashing at a greater rate than passenger's end warning light portion 133c.

FIG. 16C is a top view of plow vehicle 116 approaching signal cable 30 with plow blade 12 oriented parallel relative to signal cable 30. Plow directional arrow 120 indicates further counterclockwise rotation of plow blade 12 has been accomplished to a position parallel to boundary curb 122. Warning light portions 133a, 133b, and 133c are all immediately adjacent to boundary curb 122 and at the same relative distances from signal cable 30 and receiving the same strength of signal 72 and are all similarly and constantly illuminated.

Figure 17:
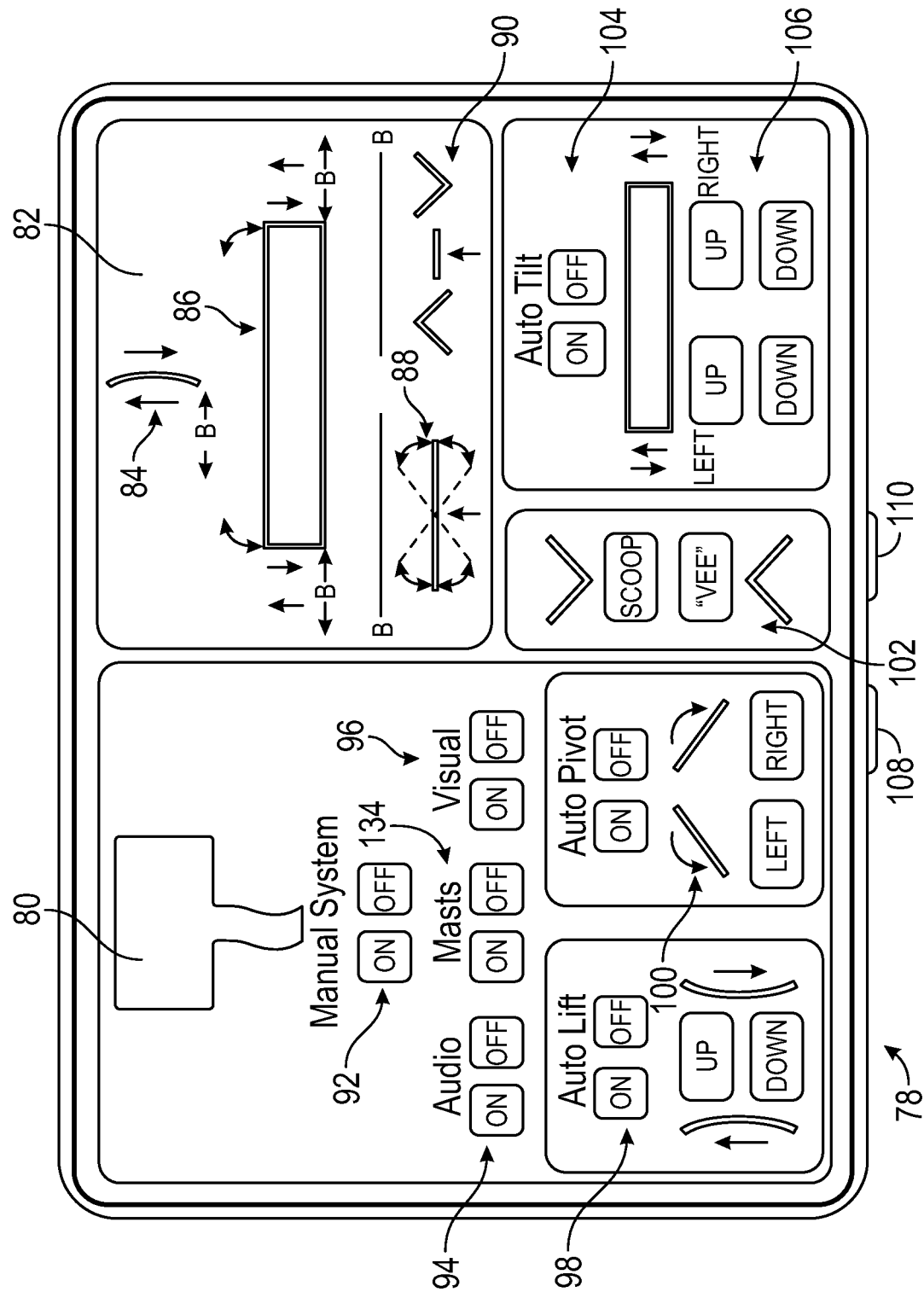
FIG. 17 is a side view of another embodiment of the control unit of the plow collateral damage mitigating system, wherein the control unit further includes a plow positional indicator mast switch.

FIG. 17 is a side view of control unit 78 indicating plow positional indicator mast switch 134.

Now, with initial reference to FIG. 17, an illustrative embodiment of the intermittently/variably illuminated plow positional indicator mast 130 will be described. The illustrative embodiment is enabled or disabled by plow positional indicator mast switch 134 on control unit 78 as illustrated in side view FIG. 17. This embodiment, via its connections with control unit 78 through the electrical connections of harness of plow assembly 10, is synchronous with any other audial and visual cues available in the cab of a plow vehicle.

FIG. 13 is a side view of mast assembly 130 attached to receiver 20 via indicator mast point of attachment 131 where mechanical and electrical connections are made to receiver 20 and the plow system in general. Preferably, for ease of manufacture and installation, and as shown in FIG. 12, indicator mast assembly 130 may be mechanically and electrically attached to the top of receiver 20 at each end of plow blade 12 of plow assembly 10 and, if plow blade 12 is articulated, the center as well. If there are line-of-sight issues with the center or lateral masts, the indicator mast assemblies 130 may telescope downward or be mounted upon the plow blade with fold-down hinging hardware including detents, as necessary, with the lateral masts folding towards the plow midline and the center mast folding down in the most convenient direction.

As shown in FIG. 13, upright portion of indicator mast 132 is subdivided into nature of boundary hazard subsections, in this illustration, 132a and 132b. Soft boundary hazard subsection 132a is for grass and other easily damaged boundary features, which likely would not present high risk for harm to plow assembly 10. Solid boundary hazard subsection 132b is for hard boundary hazards or obstructions, which would present significant potential for damage to plow assembly 10 and plow blade 12. Soft boundary hazard subsection 132a may illuminate with wording indicative of a soft boundary and may display yellow warning coloration for potential damage to friable perimeter features. Solid boundary hazard subsection 132b may illuminate with wording indicative of hard boundary obstructions such as a curb, and may also display red warning coloration for possible damage to plow blade 12 and plow assembly 10. At the top of upright portion of indicator mast 132 is located warning light portion 133, which may be a white or colored bulb, diode or other light-emitting device. Warning light portions 133 are not usually illuminated during plow transport from one work site to another. During plow-related activity and when in relatively close proximity to a boundary, or a boundary is being approached, indicator mast assembly 130 functionality is evident. For instance, when in proximity to a boundary, and otherwise in response to increasing strength of signal 72 from signal wire 30, warning light portion(s) 133 would begin to slowly blink, for example when a receiver is within 1 to 2 plow widths of a boundary and possibly with green colored light emission, with the flash frequency increasing as any perimeter hazard becomes more proximate, perhaps as a yellow light emission when a receiver is within ½ to 1 plow width of the boundary, until light emission is constant, perhaps with red coloration when the receiver is immediately proximate or adjacent to a boundary with imminent contact (or violation of) the boundary hazard. Soft boundary hazard subsection 132a and solid boundary hazard subsection 132b may be intermittently illuminated synchronously with their respective warning light portion(s) 133.

Illustrated in top view FIGS. 14A-14E are various lighting scenarios demonstrating variable calibration and functionality of driver's end indicator mast 130a at the driver's end of plow blade 12, center indicator mast 130b at the middle portion of plow blade 12, and passenger's end indicator mast 130c at the passenger's end of plow blade 12 with respect to plow directional arrow 74. Depending upon orientation, relative proximity to boundary, and configuration of plow blade 12, certain warning light portions 133 may or may not be illuminated, either intermittently or continuously, due to strength of signal 72 as transmitted through signal cable 30 and acquired by receivers 20. FIG. 14A shows straight plow blade 12 configuration with driver's end warning light portion 133a, center warning light portion 133b, and passenger's end warning light portion 133c all continuously illuminated due to equidistant and very close proximity to signal cable 30. FIG. 14B shows scoop-shaped configuration of plow blade 12 with warning light portions 133a and 133c intermittently illuminated due to closer proximity to signal cable 30 and warning light portion 133b not illuminated due to greater distance from signal cable 30. FIG. 14C shows V-shaped configuration of the plow blade 12 with only warning light portion 133b constantly illuminated. Driver's end warning light portion 133a and passenger's end warning light portion 133c are intermittently illuminated due to relative increased distance from signal cable 30. FIG. 14D shows passenger's end warning light portion 133c constantly illuminated due to the passenger's end of the plow blade 12 being very close in proximity to signal cable 30 versus warning light portions 133a and 133b. However, center warning light portion 133b is intermittently illuminated due to relative increased distance from signal cable 30 and driver's end warning light portion 133a is not illuminated due to even further distance from signal cable 30. FIG. 14E shows the reverse scenario with driver's end warning light portion 133a constantly illuminated due to its closer proximity to signal cable 30, as compared to intermittently flashing center warning light portion 133b and non-illuminated passenger's end warning light portion 133c, each due to their relative increased distance from signal cable 30.

FIG. 15 shows plow blade 12 moving at a tangent to a boundary according to plow directional arrow 74 and signal cable 30 located at the driver's side of the vehicle. For illustrative purposes, driver's end warning light portion 133a is constantly illuminated due to close proximity to signal cable 30. Center warning light portion 133b and passenger's end warning light portion 133c are not illuminated due to increased relative distance from signal cable 30 and level of calibration.

FIGS. 16A-16C and 17 demonstrate integration of the intermittently/variably illuminated plow positional indicator mast with other components of a plow collateral damage mitigating system. In these illustrations, with auto-pivot engaged via auto pivot switch 100, and through connections with control unit 78, visual cues are synchronized with audial and visual cues within the cab of plow vehicle 116. FIG. 16A illustrates the plow vehicle 116 approaching the perimeter from a distance, at a constant 55° angle as indicated by plow vehicle directional arrow 118, with the driver's side of the vehicle more proximate to boundary curb 122 and plow blade 12 angled approximately 35° relative to the boundary. Directional arrow 120 indicates no relative change in the perpendicular disposition of plow blade 12 with respect to plow vehicle 116 and plow vehicle directional arrow 118. Warning light portions 133a, 133b, and 133c on the top of mast assemblies 130a, 130b, and 130c are not yet illuminated due to relative increased distance from signal wire 30 and low strength of signal 72. FIG. 16B illustrates the plow vehicle closer to boundary curb 122 and relative strength of signal 72 from signal cable 30 is sufficient to engage auto-pivot thusly repositioning plow blade 12 as indicated by plow directional arrow 120, through action of hydraulic actuators 14, to approximately 15° relative to boundary curb 12 while plow vehicle 116 continues ahead at the previous 55° angle as indicated by directional arrow 118. Driver's end warning light portion 133a, at the top of driver's end indicator mast 130a, center warning light portion 133b at the top of center indicator mast 130b, and passenger's end indicator warning light portion 133c at the top of passenger's end indicator mast 130c are all acting upon signal 72 detected by receivers 20 from signal wire 30 at different relative, but progressively increasing strength, with driver's end warning light portion 133a blinking at a faster rate than center warning light portion 133b, which, in turn, is blinking at a faster rate than passenger's end warning light portion 133c due to relatively diminished proximity. FIG. 16C demonstrates plow blade 12 has auto-rotated, as indicated by plow directional arrow 120, to parallel with boundary curb 122, and with boundary curb 122 impact imminent, driver's end warning light portion 133a, center warning light portion 133b, and passenger's end warning light portion 133c are all constantly illuminated indicating very close proximity to perimeter and maximal strength of signal 72 from signal cable 30.

In an alternative embodiment, the indicator mast assembly is provided as part of a lower cost upgrade option for older equipment or plow-equipped ATV's or other such machines. Control unit 78 is not involved in function of the masts, nor plow blade. Similarly-calibrated indicator mast assemblies 130 function as standalone or independent units in response to one or more signal(s) 72 transmitted by one or more signal wires within signal cable 30 at the boundaries of a plow surface. Each independently functioning unit may have its own battery or be electrically connected to a vehicle battery. FIGS. 14A-14E demonstrate the functionality of this basic alternative embodiment. It provides visual cues from warning light portions 133 and/or subsections of upright portion of indicator mast 132, in response to signal(s) 72 generated from transmitter 32, concerning position of various portions of the plow blade relative to a boundary.

8. Plow-Related Damage Mitigation Subsystem for Friable Surfaces

In a further embodiment, the plow collateral damage mitigating system includes a plow-related damage mitigation subsystem for friable surfaces that aids in the monitoring and repositioning of the relative elevation of a plow blade with respect to a boundary, and space, of friable surface to be cleared of snow, as demarcated by an appropriate signal originating from a transmitter attached to, and emanating from, a signal wire or other appropriate aboveground or in-ground source at a boundary of an area to be serviced.

The plow-related damage mitigation subsystem is useful in situations where there are unpaved driving and parking surfaces to be cleared of snow. Settings where this plow-related damage mitigation subsystem would be particularly useful include commercial parking lots, unpaved (and often crowned) residential driveways, truck lots, rural/agricultural/farm settings, and access roads. Often in places such as these, various materials have been spread upon surfaces to prevent vehicles from becoming bogged down in an otherwise muddy quagmire. In addition, there are often situations encountered where there is a transition from a paved surface to either gravel or grass-covered surfaces where vehicles or trailers may be transiting or parked. In the absence of the current invention, and especially if surfaces are uneven, a plow blade often functions more like a bulldozer peeling sod and/or displacing/repositioning cover materials, such as stone.

In this further embodiment, the plow-related damage mitigation subsystem for friable surfaces allows for automatic and/or remotely controlled incremental elevation of the cutting edge of a plow blade above surfaces that would otherwise be damaged with the plow blade in fully down position. Advantageously, the plow-related damage mitigation subsystem provide the plow operator with remotely variable, and/or automatic, vertical repositioning of the plow blade in order to preserve friable grass covered surfaces in undisturbed/undamaged condition, as well as eliminate scraping and displacement of sod or other cover materials, including gravel or stone, from driving and parking surfaces.

Prior to describing the illustrative embodiment of this subsystem of the plow collateral damage mitigating system, various objects of the plow-related damage mitigation subsystem will be described.

An object is to provide a plow-related damage mitigation subsystem for friable surfaces, which raises the cutting edge of a plow blade above the work surface.

Another object is to provide a plow-related damage mitigation subsystem for friable surfaces, which variably raises the cutting edge of a plow blade above the work surface.

Another object is to provide a plow-related damage mitigation subsystem for friable surfaces, which minimizes damage to friable worksite surfaces.

Another object is to provide a plow-related damage mitigation subsystem for friable surfaces, which minimizes tangential damage to uneven surfaces.

Another object is to provide a plow-related damage mitigation subsystem for friable surfaces, which is variable during use of a plow assembly.

Another object is to provide a plow-related damage mitigation subsystem for friable surfaces, which is responsive to remote calibration from the cab of a plow vehicle.

Another object is to provide a plow-related damage mitigation subsystem for friable surfaces, which is capable of automatic calibration.

Another object is to provide a plow-related damage mitigation subsystem for friable surfaces, which is capable of automatic reset based on GPS coordinates.

Another object is to provide a plow-related damage mitigation subsystem for friable surfaces with capability for variable calibration from the cab of a plow vehicle.

Another object is to provide a plow-related damage mitigation subsystem for friable surfaces, which is responsive to signals from a transmitter and cable.

Another object is to provide a plow-related damage mitigation subsystem for friable surfaces, which can provide for overlapping functionality through its components, of the auto-tilt feature of the plow-related damage mitigating subsystem.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being call to the fact, however, that the drawings are illustrative only, and that changes may be made in the specific construction illustrated and described within the scope of this application.

Turning now descriptively to the drawings of the illustrative embodiment, in which similar reference characters denote similar elements throughout the views, the figures generally illustrate one or more embodiments of the plow-related damage mitigating subsystem.

An illustrative embodiment of the plow-related damage mitigating subsystem will now be described with reference to FIGS. 5 and 18-20C. As described above, FIG. 5 presents a view of signal cable 30 capable of emitting signals 72 of varying frequencies.

Figure 18:
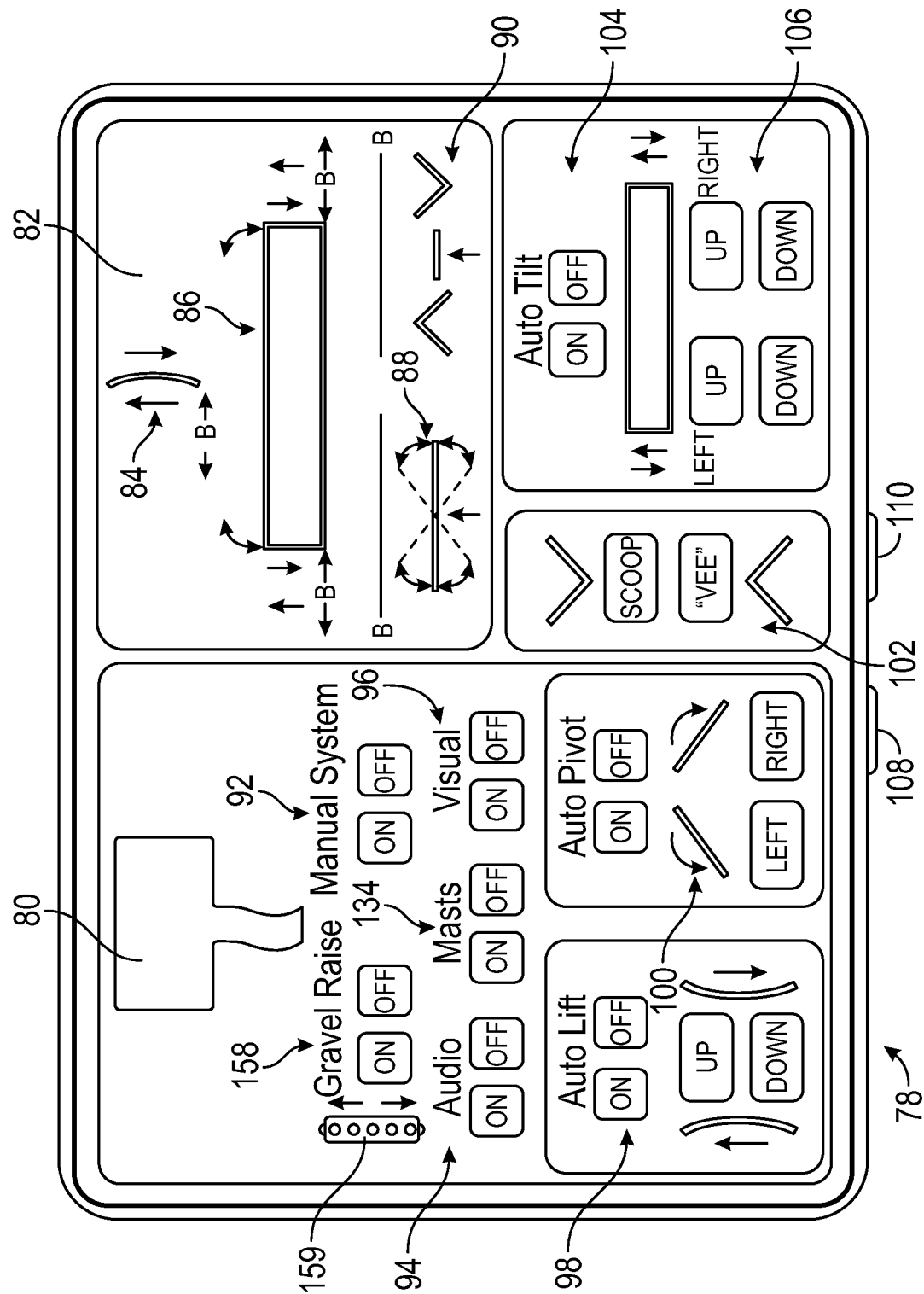
FIG. 18 is a side view of yet another embodiment of the control unit of the plow collateral damage mitigating system, wherein the control unit further includes a gravel raise switch, gravel raise reset button, and calibration knob for the plow-related damage mitigation subsystem for friable surfaces.

FIG. 18 is a side view of control unit 78 indicating plow-related damage mitigation subsystem for friable surfaces that includes gravel raise switch 158 and calibration knob 159. While not illustrated in FIG. 18, the control unit 78 may further include a raise reset button for the plow-related damage mitigation subsystem for friable surfaces.

Figure 19:
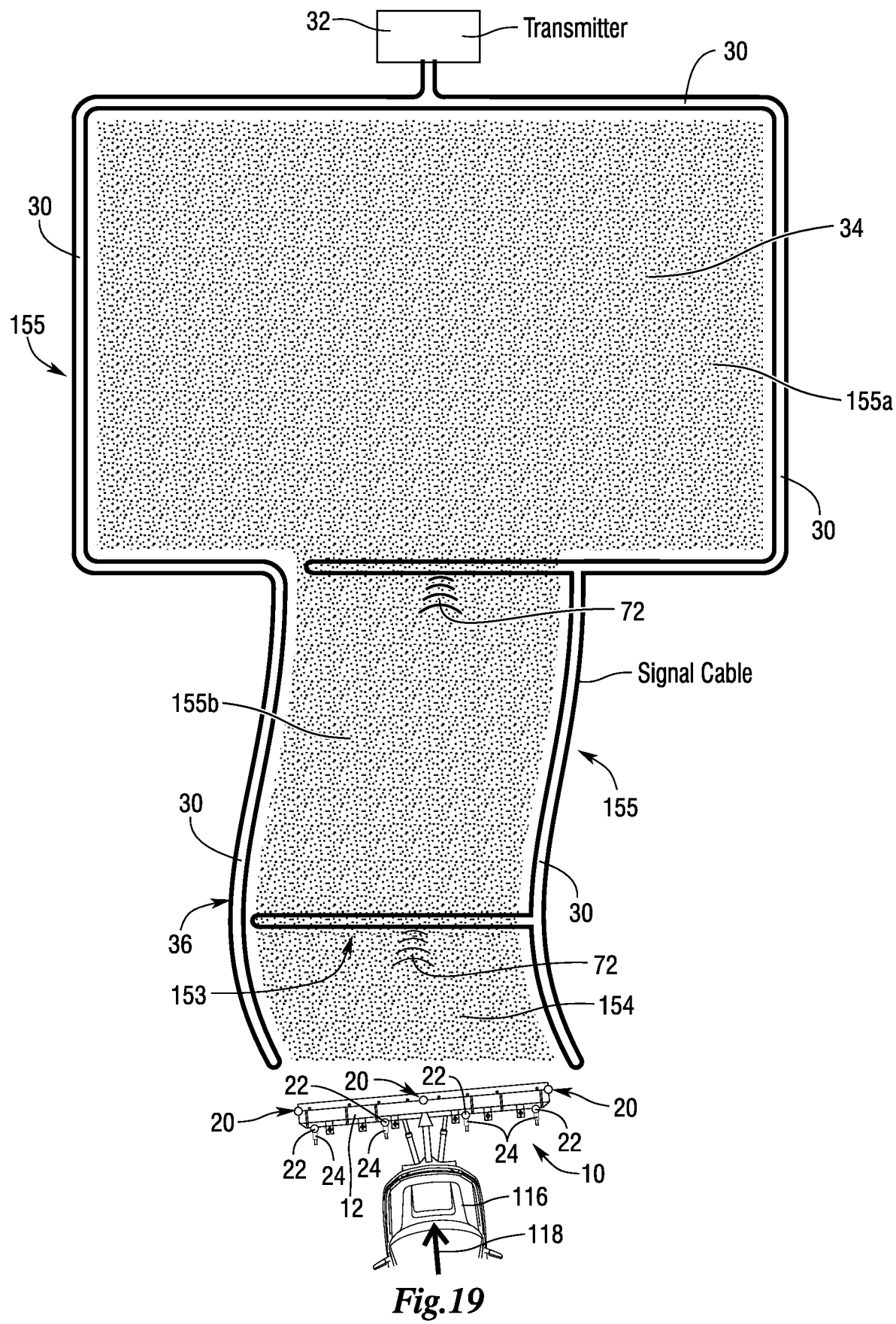
FIG. 19 is a top view of an illustrative parking area with a plow vehicle entering a driveway, and a transmitter connected to a signal cable disposed at the perimeter of representative areas to be cleared of snow.

FIG. 19 is a top view of parking area 34 with plow vehicle 116 entering driveway 36, and transmitter 32 connected to signal cable 30 disposed at the perimeter of representative areas to be cleared of snow.

Figure 20A:
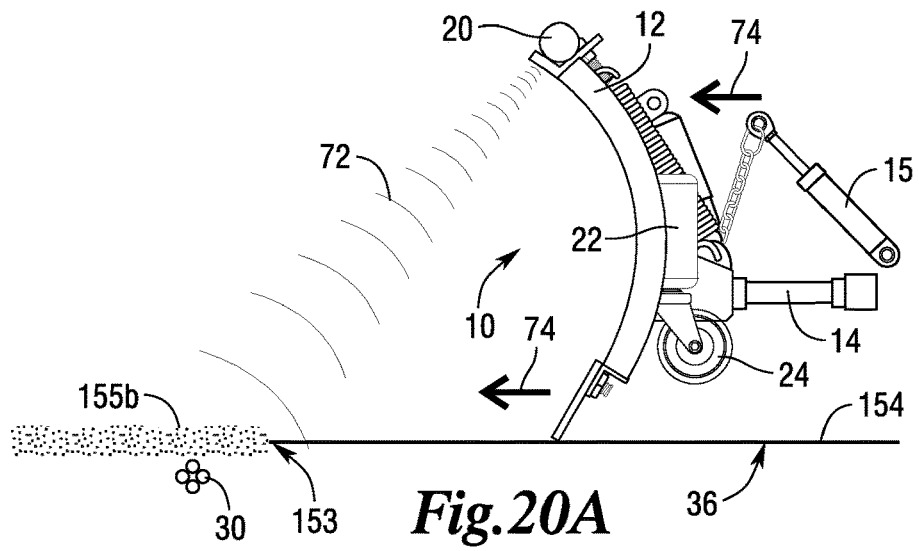
FIG. 20A is a side view of a straight plow blade of a plow assembly approaching a signal cable, according to one illustrative embodiment of the plow-related damage mitigation subsystem, wherein the wheel mechanism is retracted above, and the plow blade is fully down against, paved surface.

FIG. 20A is a side view of a straight plow blade 12 of plow assembly 10 approaching signal cable 30 as indicated by directional arrow 74. Wheel mechanism 24 is retracted above, and plow blade 12 is fully down against, paved surface 154.

Figure 20B:
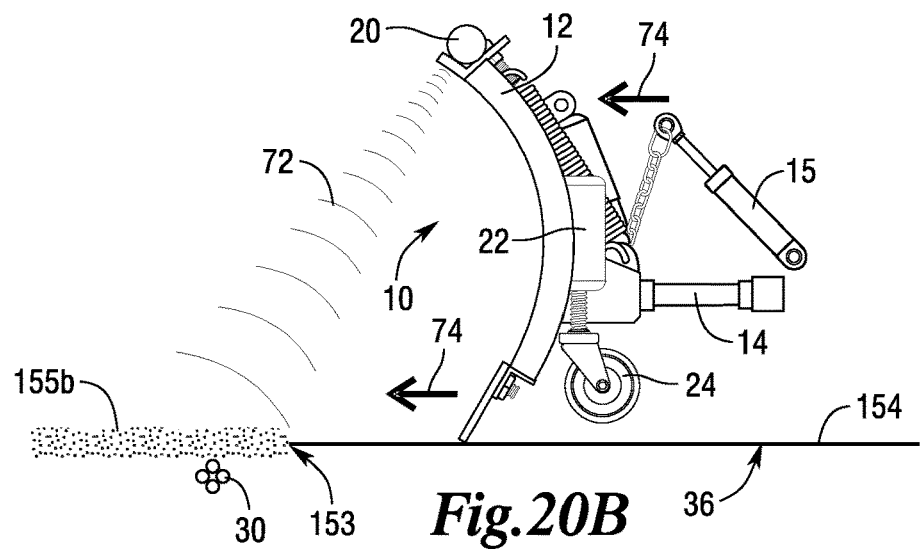
FIG. 20B is another side view of a plow blade of FIG. 20A approaching the signal cable 30, wherein the wheel mechanism is moving downwards towards pavement surface.

FIG. 20B is a side view of plow blade 12 approaching signal cable 30 with wheel mechanism 24 moving downwards towards pavement surface 154.

Figure 20C:
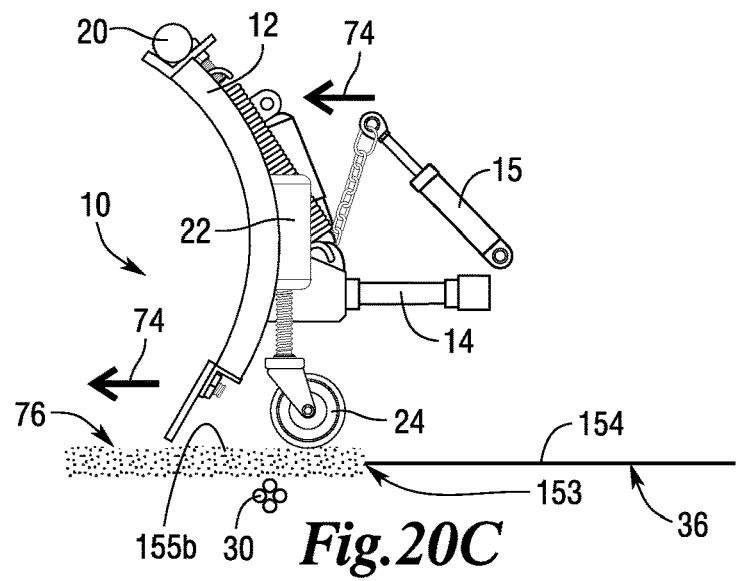
FIG. 20C is yet another side view of a plow blade of FIG. 20A, wherein the plow blade is beyond signal cable with wheel mechanism downwardly deployed in order to raise plow blade above and free from contact with surface of driveway covered with crushed limestone.

FIG. 20C is a side view of plow blade 12 beyond signal cable 30 with wheel mechanism 24 downwardly deployed in order to raise plow blade 12 above and free from contact with surface of driveway covered with crushed limestone 155*b*.

Now, with initial reference to FIG. 18, an illustrative embodiment of the plow-related damage mitigation subsystem for friable surfaces and its components will be described. In the illustrative embodiment, the plow-related damage mitigation subsystem is enabled or disabled by gravel raise switch 158 on control unit 78, and is fine-tuned, varied or calibrated through calibration switch 159 as illustrated in FIG. 18. Calibration switch 159 may have progressive detents with appropriate visual cues for various surface conditions such as grass, dirt, crushed stone and stone. This embodiment, via its connections with control unit 78 through electrical connections of harness of plow assembly 10, is synchronous with any other audial and visual cues available in the cab of a plow vehicle.

In the illustrative embodiment, the non-volatile memory storage device (e.g., a hard drive) in control unit 78 may also remember, by GPS coordinates, the location of the unpaved surface or surfaces and also the level of calibration for purposes of efficiency during subsequent snow removal sessions. Default level of calibration would accommodate bulky and potentially more uneven surface materials such as 2B-type gravel. Depending upon the disposition of signal cable 30, additional assistance in calibration may come from signal 72 originating from transmitter 32 and emanating from below the surface to be cleared. Once gravel raise switch 158 is activated at control unit 78, it may remain as the default mode of operation until manually reset via a gravel raise reset switch, turned off via gravel raise switch 158, or reset due to system location change as determined by GPS coordinates.

While plowing unpaved surface 155 in FIG. 19, plow blade 12, in the absence of this embodiment, always contacts, and to a variable extent, disrupts, displaces or damages friable surface materials. Also of note is that some snow plows are equipped with a mechanism which applies down force on the blade making damage to friable surfaces much more severe.

Examples of covering materials include dirt, grass, crushed limestone, 2B-type gravel, or other appropriate substances used in place of solid surface concrete or asphalt. With repeated passes of plow blade 12 while in fully-down position (so plow blade 12 is in constant contact with the supporting surface), materials are gradually abraded and moved towards the boundary of the area to be cleared of snow. This collateral damage necessitates repair work at the end of the snowfall season. Often, the material is not easily redistributed back upon the surface from whence it was displaced. Anyone who has attempted to retrieve previously displaced crushed limestone or gravel, through the use of a shovel or rake from (especially long) grass, back onto a driveway or parking lot will attest to the attendant difficulties. Expenses associated with replacement and resurfacing may be incurred. Resurfacing often requires additional equipment, as materials are often very heavy and impractical to handle manually.

There are also safety concerns. Particularly when surfaces are dirt, stone, mud, frozen and/or rutted, plow blades regularly become subjected to a more or less transversely oriented stubbing or jamming force directed at the inferior cutting edge, which may then cause damage to the equipment or bring the plow vehicle to a sudden halt. This may present a hazard to the operator. However, when the plow blade is significantly angulated either left or right, resultant force vectors may cause the plow vehicle to slide or veer in the direction opposite from which the plow blade is angled and therefore away from the intended direction of travel thus presenting a hazard to the vehicle, plow equipment, and driver. This same scenario could easily result in significant collateral property damage while clearing snow from between parked vehicles or trailers. Manual engagement of this embodiment in an area not serviced by transmitter 32 and signal cable 30 would be a welcomed option for use by any plow operator.

FIG. 19 is a top view illustrating the functionality of this embodiment. Plow vehicle 116 enters driveway 36 according to plow vehicle directional arrow 118 and clears paved surface 154. The plow system functions as per usual in this segment of driveway 36. However, there is a transition from paved surface 154 to unpaved surface 155. Signal cable 30 is positioned and configured to allow recognition by control unit 78 of transition 153 to unpaved surface 155. In this case, driveway covered with crushed limestone 155*b* is first encountered. With appropriate signal 72 emanating from within signal cable 30, and in response to signal 72 as detected by receivers 20, control unit 78 directs the downward deployment of wheel mechanisms 24 (for purposes of this illustration, there are two of each on either side of the midline of plow blade 12 of plow assembly 10) via electric motorized or hydraulic mechanisms 22 raising plow blade 12 to rest upon wheel mechanisms 24 and appropriately elevated so as not to disrupt crushed limestone on this portion of unpaved surface 155. As progress is made towards parking area covered with 2B-type gravel 155*a*, appropriate signal 72 emanating from signal cable 30 indicates parking area covered with 2B-type gravel lies ahead and wheel mechanisms 24 are downwardly deployed an additional increment in order to accommodate the more roughly contoured surface. Wheels (of wheel mechanisms 24) of variable numbers, composition, radii, and width, which are able to freely swivel 3600 to allow back dragging of snow with plow blade 12 at all levels of deployment, are disposed to either side of the plow midline, and allow adequate "float" above relatively uneven friable surfaces while diminishing the chances for tangential skiving along the entire cutting edge upon the underside of plow blade 12. Multiple electric motorized or hydraulic mechanisms 22 and associated wheel mechanisms 24 are particularly helpful when surfaces are crowned, such as with a narrow driveway or access road. The closer certain wheels are disposed to the midline of the plow, in addition to more laterally disposed wheels, the more affective is mitigation of damage.

FIGS. 20A-20C are side views demonstrating functionality of this embodiment as discussed in FIG. 19. In FIG. 20A, plow assembly 10 is advancing as per plow directional arrow 74 from paved surface 154 towards driveway covered with crushed limestone 155*b*. Appropriate signal 72 is detected by receiver 20 from signal cable 30 with increasing strength and relayed to control unit 78. FIG. 20B demonstrates electric motorized or hydraulic mechanism 22 downwardly deploying wheel mechanism 24. FIG. 20C illustrates appropriate downward deployment of wheel mechanism 24 by electric motorized or hydraulic mechanism 22 so wheel mechanism 24 is rolling over driveway covered with crushed limestone 155*b* with the lower edge of plow blade 12 cantilevered above the friable surface materials.

Because of multiple component wheels employed, this system dovetails with the auto-tilt mode of the plow-related damage mitigating system. This has the advantage of lowering manufacturing costs and providing for overlap and functionality thus eliminating component redundancy and decreasing cost to consumer.

An alternative embodiment provides for elevating the plow blade via the existing hydraulic mechanism. As the plow vehicle approaches the boundary demarcating paved from unpaved surfaces, the plow blade is automatically elevated above the surface to be cleared in order not to disrupt the friable surface materials. This embodiment is most valuable when the plow blade is oriented as closely to perpendicular to the direction of travel of the plow vehicle as possible. However, the more severely angulated the plow blade is relative to the direction of travel of a plow vehicle, the higher the blade must be raised in order that the proximate corner of the blade will clear the ground adequately so as not to disrupt the friable surface materials. Geometry dictates, however, the distal corner of the blade will then be proportionately higher from the plow surface.

Yet another alternative embodiment would provide for a modification of the above-described alternate embodiment where the plow blade is able to be repositioned in the sagittal plane at its point of attachment to the rest of the blade mechanism, or be capable of reorientation in the sagittal plane at some point proximate to the above, through multiple articulations within the plow frame between its point of connection to plow vehicle and the plow blade itself, with or without the aid of additional hydraulic mechanisms, so that no matter how high the plow blade needs to be raised in order to clear the friable surface materials, the entire length of the inferior cutting edge of the plow blade is maintained in a plane parallel with the plane of the surface to be cleared regardless of angulation relative to the direction of travel of the plow vehicle.

9. Alternative Embodiments of the System

Now, alternative embodiments of the plow collateral damage mitigating system will be described hereinafter. It is to be understood that the plow collateral damage mitigating system does not necessarily require the presence of every component described herein or those described below. Rather, the plow collateral damage mitigating system can be embodied in many different forms.

In one alternative embodiment, the plow collateral damage mitigating system functions entirely through the existing hydraulic lift system eliminating the wheels at either end of the plow. As the boundary for plowing is approached, the plow is lifted and pivoted incrementally through the action of the existing hydraulic lift mechanism.

In another alternative embodiment, the plow collateral damage mitigating system includes a separate visualization screen display more in the line of site of the plow operator away from the main control module 78 and/or heads-up display projected onto the windshield reflective of plow, boundary and work site conditions.

In yet another alternative embodiment, the plow collateral damage mitigating system allows for the exclusion or incorporation of any of the features included in the illustrative embodiment. For example, one may opt only for visualization cues as to proximity of the plow blade to the border, obstructions and hazards.

In still another alternative embodiment, the plow collateral damage mitigating system provides for an upgrade for existing plow systems. The wiring harness is connected to an upgrade-designed older-model-specific control module, which would use the existing hydraulics with retrofitted receivers mounted on the plow blade and signal wires brought back to the control module in convenient fashion. Audio signaling may be a part of this embodiment. The existing hand held controller, if there is one associated with the existing model, may or may not plug into, and may be accommodated by the control module. There may be accommodations for the addition of (tilting) vertical orientation mechanisms at either end of the blade.

In yet another alternative embodiment, the plow collateral damage mitigating system includes another hydraulic ram or other lifting mechanism disposed at either end of the plow blade, which vertically retracts a certain portion of the blade upward and away from the supporting surface to a varying degree and is mirrored by a similar mechanism operating independently at the other end of the blade.

In still another alternative embodiment, the plow collateral damage mitigating system allows for wireless connectivity through a smartphone in the possession of the operator, which individualizes operation of the current device and plow mechanism, worksite shape and location, and eliminates interference from adjacent plow sites.

In yet another alternative embodiment, the plow collateral damage mitigating system dispenses with the outboard vertical orientation mechanism as described above and, instead, allows for an axial re-orientation mechanism functioning at or near the base of the plow in the vicinity of its attachment to the vehicle, which induces a twisting force upon the plow blade raising one end or the other.

In yet another alternative embodiment, as will be described in further detail hereinafter, the plow collateral damage mitigating system includes its deployment upon municipal plow devices with a receiver mounted on at least the out-rigger or wing section of the plow, which generally clears the berm of the road. Upon reception of the appropriate signal along the roadway, such as from a buried cable or perhaps a battery-operated transmitter within the obstruction or hazard, the system allows audial cue, visual cue, and the option for automatic retraction of the outboard section of the plow away from the object to be protected, such as the lawn or mailbox of a roadside home.

In still another alternative embodiment, the plow collateral damage mitigating system allows for incorporation of appropriate features onto snow-blowers and all-terrain vehicle (ATV) plows.

10. Municipal Plow Embodiment

Now, a further municipal plow embodiment of the plow collateral damage mitigating system will be described in detail hereinafter. In this illustrative embodiment, a receiver 20 is placed at an upper drivers and/or passenger side corner of a main municipal plow blade 10D (depending upon whether or not plow assembly 10 moves snow only to the right, or to the left and right, through hydraulic variation of angulation) or the upper distal end of wing plow 10B, which is in these illustrations passenger side-mounted on plow vehicle 116 and positioned behind and staggered from main municipal plow blade 10D. In the accompanying illustrations, only clearing of paved surface 154 to the right is illustrated with receiver 20 at distal end of wing plow 10B.

Municipal plow operators are tasked with clearing surfaces of snow on highways, secondary roads and residential streets. Vehicles and plow assemblies tend to be very large and operators must have very good visual acuity, spatial relations and depth perception in order to minimize collateral damage to adjacent hazards. Significant snowfall and difficult visibility often combine to make the task of snow removal much more difficult and the need for clearing of snow is in direct proportion to the severity of conditions. Also, the operator is usually not able to directly visualize the distal end of a wing plow, which is side mounted on the vehicle and positioned behind the main plow blade. Operators can utilize all available help.

Wing plows are often employed to clear berms of highways and secondary roads, but are generally not used upon narrow streets of inner city and residential areas. Paved surfaces of narrow city streets and residential areas are generally cleared through the use of main municipal plow blades of various dimensions and angle of push variability.

Often municipal plows are configured to only plow to the right or towards the passenger side of the plow vehicle. Municipal plows configured to only plow towards the passenger side of the vehicle would usually have a wing plow mounted only on the passenger side of the plow vehicle. Municipal plows used for clearing paved surfaces of limited access divided highways, for example, might allow for variation of snow clearing capabilities towards either the left or right of the plow vehicle and might have wing plows mounted on the driver and passenger sides of the plow vehicle, respectively.

In areas of extreme snow accumulation, blowing and/or drifting, a technique known as benching is employed during which upper layers of roadside snow accumulation are cleared well beyond edge of berm 37B by wing plows 10A. Generally, a wing plow 10A employed for this technique may be raised vertically (in order not to cause damage to roadside lawns and/or other low hazards beyond edge of berm 37B) while simultaneously maintaining a fixed or variable angulation relative to direction of travel 18 of plow vehicle 116. However, with accumulations of this magnitude, a roadside mailbox may be buried and therefore undetectable visually by a snowplow operator.

The objective for any winter season is to minimize municipal plow-related collateral damage, whether it be to roadside obstructions or other hazards, or simply to landscape features such as lawns. Damage can be labor-intensive and expensive to repair. Plow operators may be subject to discipline or other adverse actions, such as job loss, as a result of excessive collateral damage. Usually operators have a specific route that they repeat because they are familiar with associated hazards. However, due to unavailability of usual operator, a substitute driver may be tasked with clearing of the road surfaces in spite of unfamiliarity with the territory. Inclement weather and impaired visibility often combine to make the job even more difficult.

Anyone living in a high snowfall region can attest to the frequency of damage to lawns along the edges of roadways of all categories. Similarly, those who live in rural regions can attest to their displeasure as a result of damage done with required repairs to their roadside mailboxes due to accidental improper tracking of a plow blade. Damage can be done in mere seconds.

Figure 24:
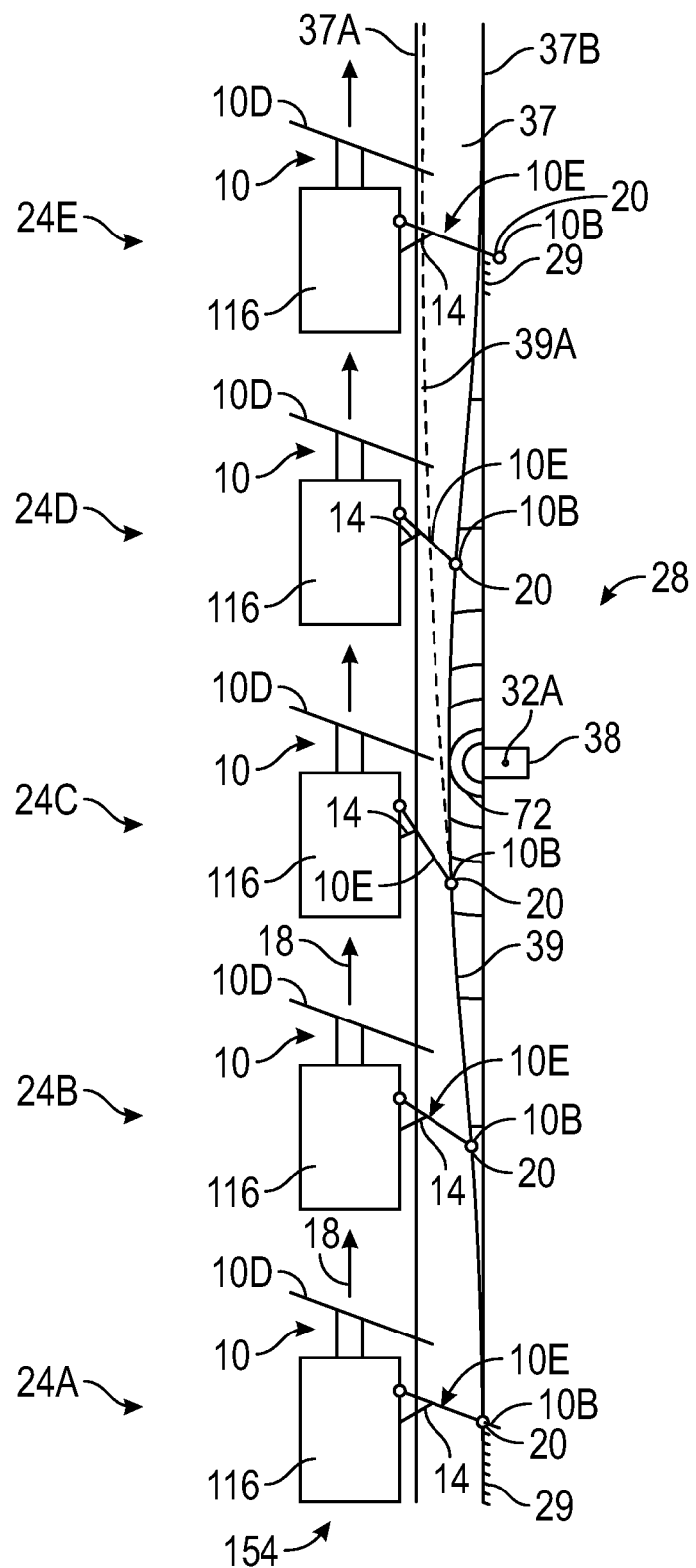
FIG. 24 is a diagrammatic overhead view of a plow vehicle with a plow assembly proceeding on paved surface with the benefit of the municipal plow control unit functionality.

Variable angulation wing plow 10E, as illustrated in FIG. 24, when fully retracted, is somewhat recessed, and parallel to, the passenger side of plow vehicle 116. Angle of deployment of wing plow 10E can be increased or decreased relative to long axis of plow vehicle 116, and thereby direction of travel 18.

Figure 25:
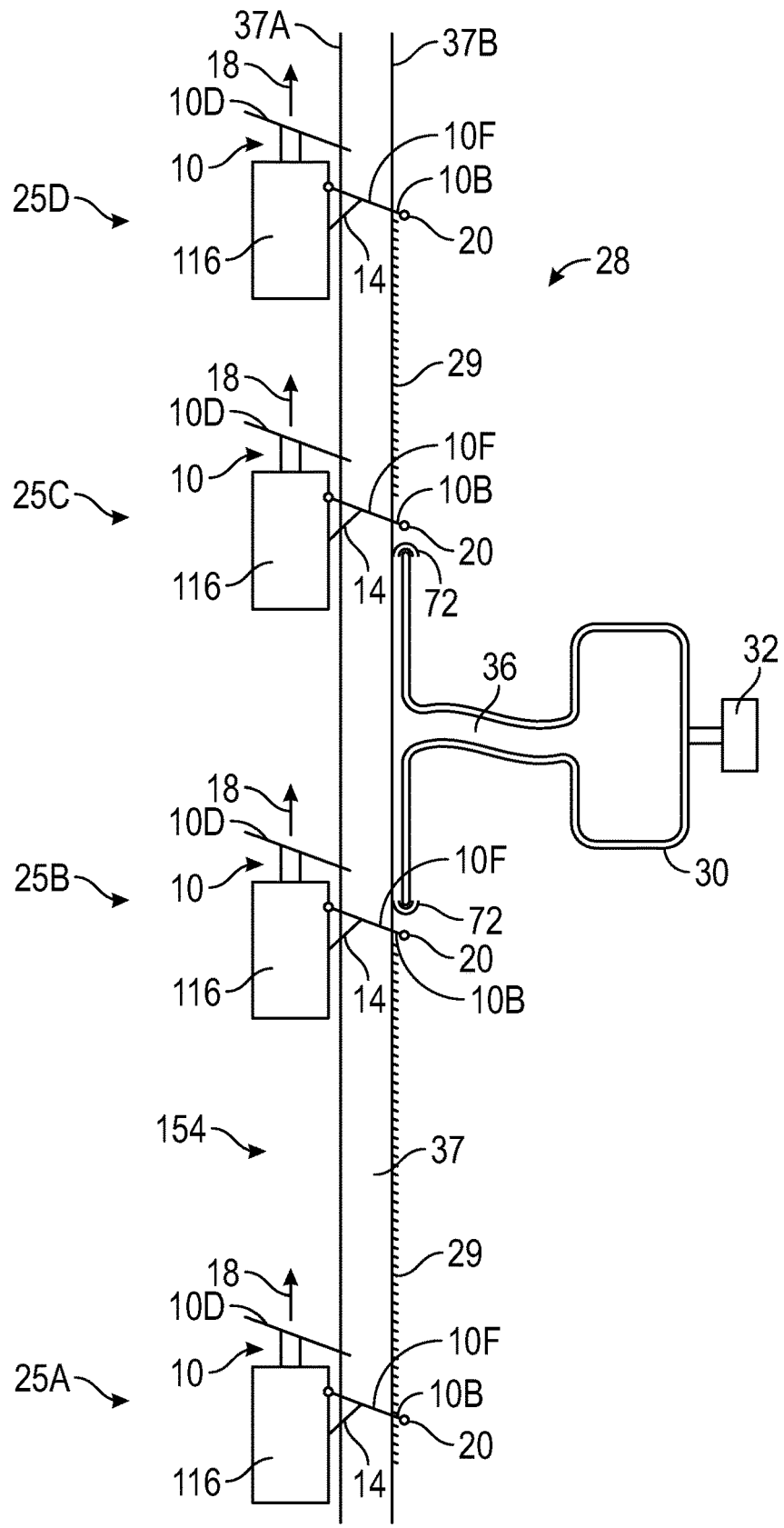
FIG. 25 is another diagrammatic overhead view of a plow vehicle with a plow assembly proceeding on paved surface while the main municipal plow blade improperly overlaps edge of road.

Fixed angulation wing plow 10F, as illustrated in FIG. 25, is non-variable in terms of angle of deployment from, and relative to, long axis of plow vehicle 116, and thereby direction of travel 18, when in fully down operational position, and is deployed from a fully up position by a pivoting and downward movement.

Unless employed during benching maneuvers, and in the absence of the current invention, wing plows are either fully up or deployed in the fully down position.

Figure 21:
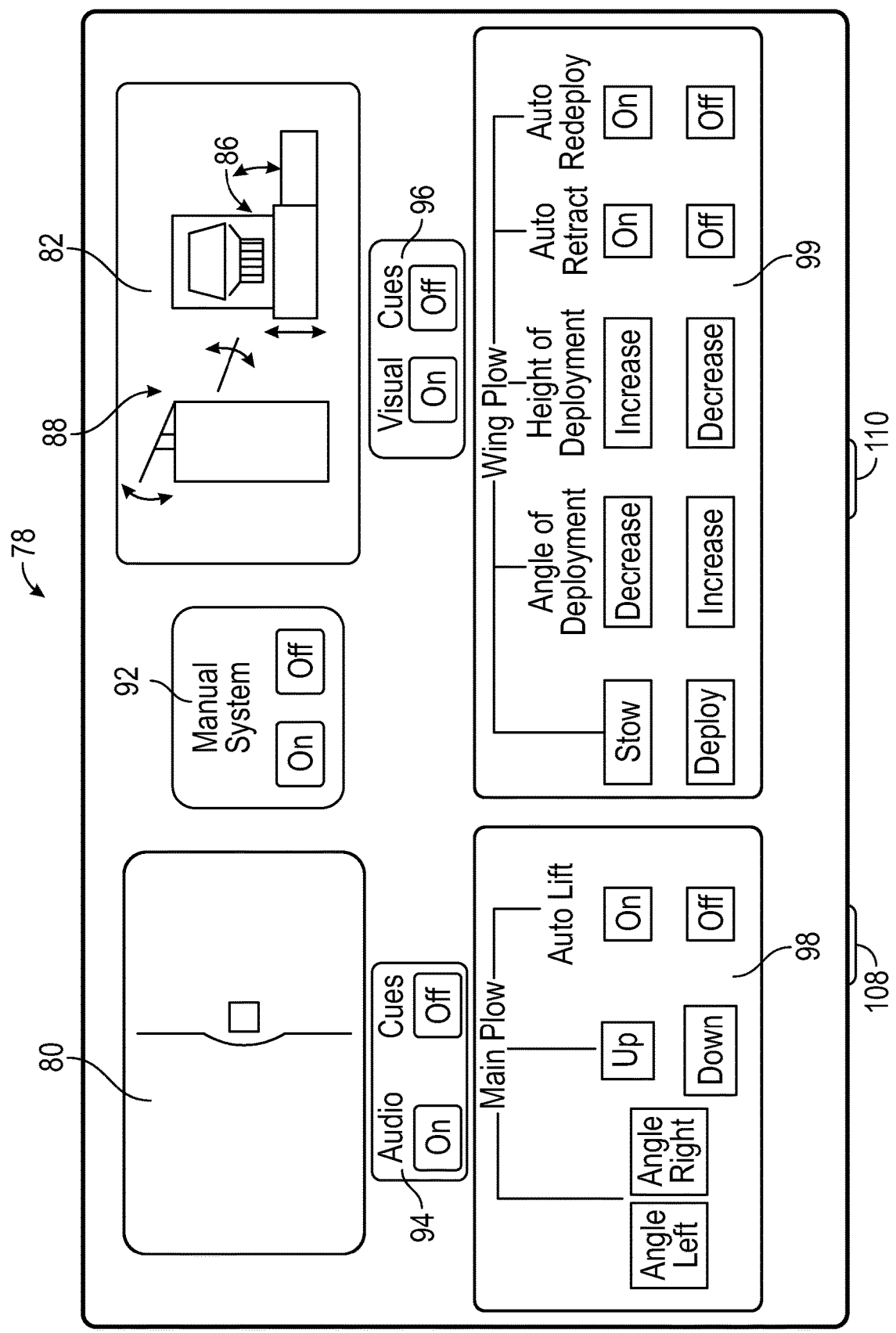
FIG. 21 is a side view of yet another embodiment of the control unit of the plow collateral damage mitigating system for a municipal plow application, wherein the control unit includes a graphical representation of site, and a second part of the visual display device with plow top view and plow degree of parallelism.

FIG. 21 is an example representation of a municipal plow control unit 78 with graphical representation of site 80, second part 82 of the visual display device with plow top view 86 and plow degree of parallelism 88. For purposes of this illustration, the main municipal plow blade 10D may be pivoted left or right and there is only one wing plow 10A, which is positioned on the passenger side of plow vehicle 116. Controls for auto lift of main plow 98 are shown. Controls for wing plow 99 are illustrated. Shown are harness plug-in port 108 for connecting to the harness of the snowplow device, and a hand held plug in port 110 for connecting to a handheld plow controller. Also pictured are manual on/off buttons 92 for activating and deactivating the system, audio cues on/off buttons 94 as well as visual cues on/off buttons 96.

FIG. 22 is an overhead view of plow vehicle 116 with plow assembly 10 proceeding on paved surface 154 as indicated by directional arrow 18. Main municipal plow blade 10D is angled right towards berm of the road 37. Portion 22A of FIG. 22 illustrates wing plow 10A as stowed and therefore nonfunctional. Distal end of wing plow 10B with top corner of wing plow-mounted receiver 20 are indicated. Portion 22B of FIG. 22 illustrates wing plow 10A as deployed by hydraulic actuator 14 with distal end of wing plow 10B paralleling edge of berm 37B.

FIG. 23 is an overhead view of plow vehicle 116 on paved surface 154 without the benefit of the current invention and progressing as indicated by directional arrow 18, parallel with edge of road 37A and edge of berm 37B. Main municipal plow blade blade 10D is moving snow to the right towards edge of road 37A. Wing plow 10A is deployed at an angle by hydraulic actuator 14 with distal end of wing plow 10B extending beyond edge of berm 37B onto grass 28 with damaged grass 29 and askew roadside mailbox 38 as illustrated.

FIG. 24 is an overhead view of plow vehicle 116 functioning with the benefit of the current invention progressing on paved surface 154 as indicated by directional arrow 18. Portion 24A of FIG. 24 illustrates plow vehicle 116 clearing paved surface 154 with main municipal plow blade 10D of plow assembly 10 angled right and improperly overlapping edge of road 37A with variable angulation wing plow 10E staggered behind and angled towards and inappropriately overlapping edge of berm 37B and contacting grass 28, resulting in damaged grass 29. Portion 24B of FIG. 24 illustrates increasing intensity of signal 72 emanating from remote transmitter 32A within roadside mailbox 38 as detected at receiver 20 at distal end of wing plow 10B inducing auto-retraction of wing plow 10E, via hydraulic actuator 14, away from edge of berm 37B. Portion 24C of FIG. 24 illustrates maximal signal 72 intensity as picked up by receiver 20 inducing retraction of wing plow 10E to avoid striking roadside mailbox 38. Portion 24D of FIG. 24 illustrates fading signal strength from remote transmitter 32A as picked up by receiver 20 with auto-redeployment of wing plow 10E towards edge of berm 37B. Portion 24E of FIG. 24 illustrates full auto-redeployment of wing plow 10E with return of damaged grass 29 at edge of berm 37B. Path of distal end of wing plow with auto-retract and auto-redeployment 39 is illustrated as well as path of distal end of wing plow without auto-redeployment 39A. The plow collateral damage mitigating system allows for storage of GPS coordinates for hazards, such as a roadside mailbox, to help prevent future damage. This feature is of value if battery or other power source of transmitter 32A were to become inoperative.

FIGS. 25 and 26 illustrate simultaneous and corresponding overhead and front or top views of yet another scenario with plow vehicle 116 moving as indicated by directional arrow 18 and main municipal plow blade 10D improperly overlapping edge of road 37A. Portion 25A of FIG. 25 shows fixed angulation wing plow 10F with distal end of wing plow 10B overlapping edge of berm 37B thereby damaging adjacent grass 28 with damaged grass 29. Shown in portion 26A of FIG. 26 is front or top view of plow assembly 10 with fixed angulation wing plow 10F in the full down position and overlapping edge of berm 37B, while main municipal plow blade 10D improperly overlaps edge of road 37A. Portion 25B of FIG. 25 illustrates receiver 20 mounted on wing plow 10F receiving signal 72 from transmitter 32 and emanating from signal cable 30, which is demarcating a boundary of grass 28 near edge of berm 37B and driveway 36. Portion 26B of FIG. 26 demonstrates fixed angulation wing plow 10F partially retracted and thereby raised above edge of berm 37B while no longer contacting and damaging grass 28. Portion 25C of FIG. 25 is a representation of plow vehicle 116 beyond the hazard demarcated by signal cable 30 with decreasing strength of signal 72 with wing plow 10F lowered back down towards edge of berm 37B and grass 28. Downward motion of wing plow 10F is illustrated in portion 26C of FIG. 26. Portion 25D of FIG. 25 shows wing plow 10F after having returned the to fully down position as also illustrated in portion 26D of FIG. 26 with resultant damaged grass 29.

Figure 27A:
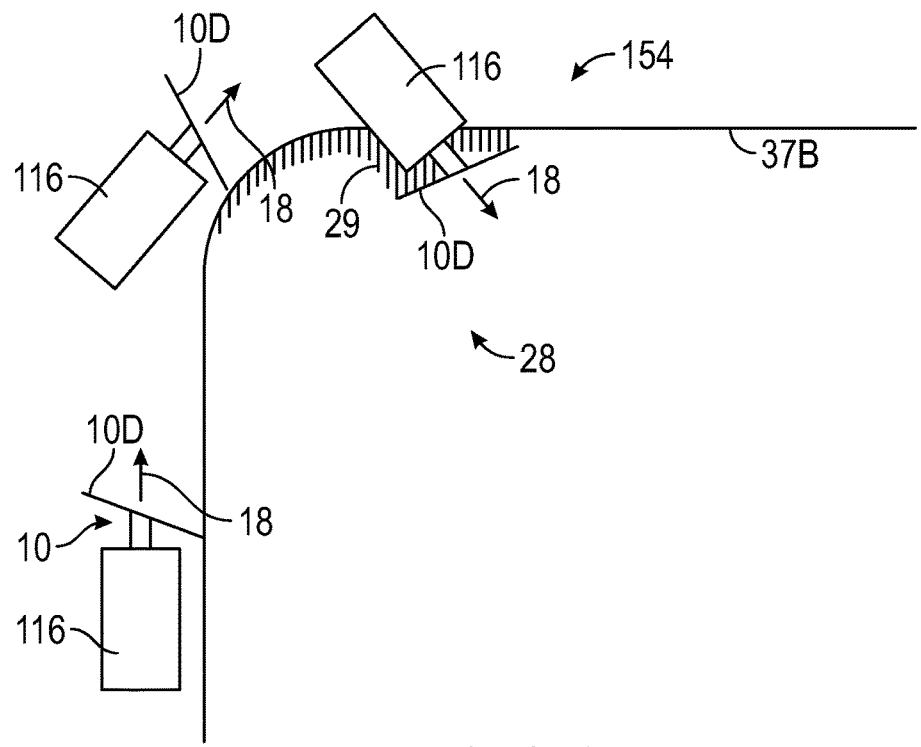
FIG. 27A is a diagrammatic overhead view of a municipal plow vehicle rounding a corner in a residential area with a minimal berm at an edge of a paved surface without the benefit of municipal plow control unit functionality.
Figure 27B:
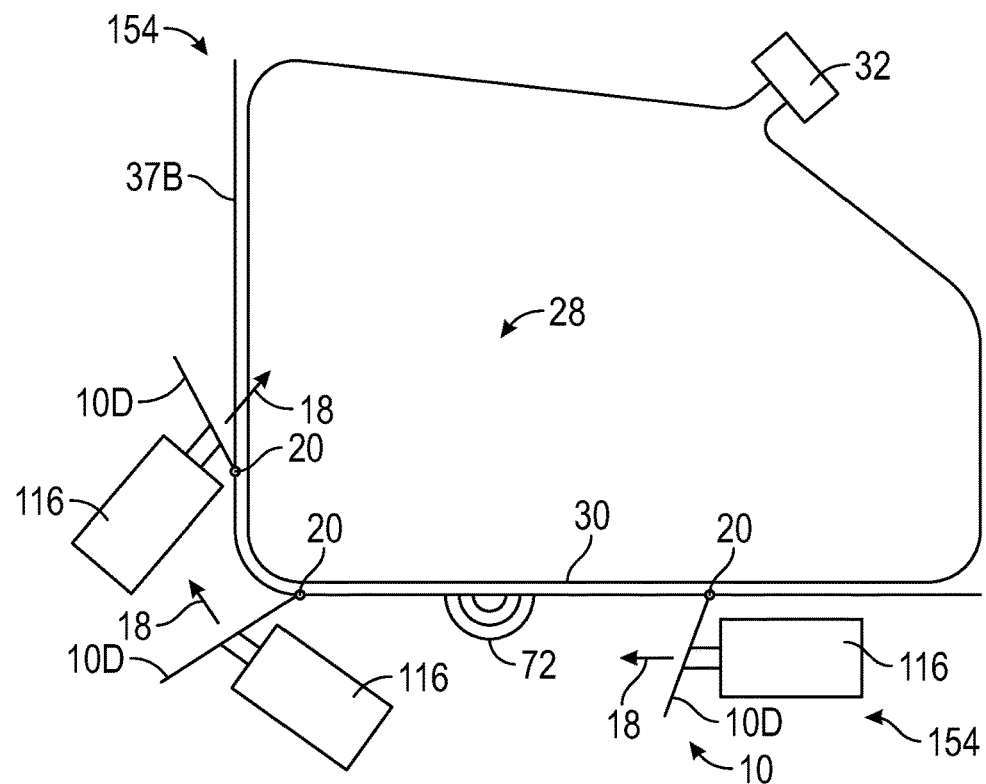
FIG. 27B is another diagrammatic overhead view of the municipal plow vehicle of FIG. 27A rounding the corner in the residential area with the minimal berm at the edge of the paved surface with the benefit of municipal plow control unit functionality.

FIGS. 27A and 27B are overhead view representations of municipal plow vehicle 116, rounding corners in a residential area with minimal berm at edge of paved surface 154, both without and with the benefit of the current invention. FIG. 27A demonstrates plow vehicle 116 rounding a right angle corner while clearing paved surface 154. The operator of plow vehicle 116, not knowing precise location of boundary, pushes main municipal plow blade 10D in full down position beyond edge of berm 37B, resulting in damaged grass 29 with an area of sod peel back of grass 28. FIG. 27B illustrates grass 28 outside of paved area 154 and beyond edge of berm 37B demarcated and protected by signal 72 emanating from signal cable 30 originating from transmitter 32. The operator alerted to edge of berm 37B through audio and visual cues and knows to stop short of a grass 28 hazard via reception of signal 72 by receiver 20 mounted at upper passenger end corner of main municipal plow blade 10D. As the operator rounds the corner, he or she is made aware of any boundary hazard via audio and/or visual cues in the cab of plow vehicle 116 and auto-lift option, if activated at control module 78, elevates plow blade 10D above the soft hazard thereby eliminating damage. If plow vehicle 116 had pushed plow blade 10D beyond the berm, there would be no sod peel back as plow blade 10D would be elevated above grass 28.

Benching is yet another plowing technique often employed in areas where there is much roadside snow accumulation, usually from previous blowing and drifting. The wing plow is equipped with appropriate additional hardware in order to allow for vertical elevation of the blade while it remains parallel with the ground and oriented for snow clearing and/or pushback. The plow is then utilized to knock drifting and other accumulating snow along the edge of berm further back away from the road. This technique of blade elevation prevents substantial damage to roadside landscape features such as grass, but also predisposes obstacles such as buried roadside mailboxes to harm. The current invention, with its auto retract and auto redeploy functions, is perfectly suited to mitigate damage to such hazards during these operations.

Aiding in functionality is GPS-related storage on the hard drive of plow vehicle control unit 78 for locations of roadside obstacles. Optionally, this would be synced with a smart phone so the operator who has a particular plow route will be automatically alerted as to the approximate location of roadside obstacles via audial or visual cues and this information can then be transferred from one operator to another. Also, the system may then automatically avoid the obstacle and this feature is particularly useful if transmitter 32 is non-functional due to a dead battery or power failure.

When activated, the auto redeploy function provides for redeployment of either type of wing plow to prior angle or position of deployment before the obstacle was encountered.

It is readily apparent that the aforedescribed plow collateral damage mitigating system offers numerous advantages. First, the plow collateral damage mitigating system mitigates the damage to a site being plowed, particularly to surrounding lawn, landscaping features, and obstructions, as well as to the equipment itself. Secondly, the plow collateral damage mitigating system allows for variably automatic elevating, tilting, pivoting, or other mechanical manipulation of a plow blade attached to a vehicle. Finally, the plow collateral damage mitigating system allows for visual cues and/or audio cues for the operator to supplement and/or replace border/obstruction/hazard-marking devices, such as stakes that may be damaged or knocked down during the snow fall season.

Advantageously, the aforedescribed plow collateral damage mitigating system is automatic and operates electronically while requiring very minimal or no action on the part of the plow operator. Also, the plow collateral damage mitigating system requires minimal additional manipulation of switches or control buttons in order to mitigate collateral damage. Further, the plow collateral damage mitigating system compensates automatically for any landscape feature after appropriate setup. In the plow collateral damage mitigating system described above, the plow blade leading edge position is varied automatically in order to protect various obstacles and minimize damage to equipment. The plow collateral damage mitigating system functions to minimize damage to any hazard or obstruction, which may be encountered during snow removal processes.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A plow collateral damage mitigating system, comprising:
 a signal transmission cable configured to be disposed around a periphery of an area that is to be plowed by a snow plow device, the signal transmission cable including at least one signal wire, the at least one signal wire configured to convey at least one signal originating from a signal transmitter disposed in or proximate to the area;

one or more receivers configured to be coupled to the snow plow device or a vehicle on which the snow plow device is mounted, the one or more receivers configured to receive the at least one signal conveyed by the at least one signal wire of the signal transmission cable; and at least one positional indicator mast configured to be coupled to the snow plow device or the vehicle on which the snow plow device is mounted, the at least one positional indicator mast configured to be at least partially visible by a plow operator and function to aid the plow operator in monitoring a position of a plow blade of the snow plow device in relation to a boundary of a surface to be cleared of snow, the at least one positional indicator mast configured to be intermittently and/or variably illuminated based upon a proximity of the boundary of the surface to be cleared of snow as determined by the at least one signal of the signal transmission cable received by the one or more receivers.

2. The plow collateral damage mitigating system according to claim 1, wherein the at least one positional indicator mast is attached to a top of the plow blade proximate to at least one end of the plow blade or a middle of the plow blade, and the at least one positional indicator mast comprises an elongate body portion extending upwardly from the top of the plow blade.

3. The plow collateral damage mitigating system according to claim 1, wherein the at least one positional indicator mast comprises a warning light portion disposed on or proximate to a top of the at least one positional indicator mast, the warning light portion comprising at least one light emitting device that is intermittently and/or variably illuminated based upon the proximity of the boundary of the surface to be cleared of snow.

4. The plow collateral damage mitigating system according to claim 3, wherein the at least one light emitting device of the warning light portion of the at least one positional indicator mast is intermittently illuminated or continually illuminated when a portion of the plow blade on which the at least one positional indicator mast is attached comes within a predetermined first distance from the boundary of the surface to be cleared of snow as determined by a strength of the at least one signal of the signal transmission cable received by the one or more receivers.

5. The plow collateral damage mitigating system according to claim 4, wherein, when the portion of the plow blade on which the at least one positional indicator mast is attached comes within the predetermined first distance from the boundary, and the at least one light emitting device of the warning light portion of the at least one positional indicator mast is intermittently illuminated, a blink rate of the at least one light emitting device gradually increases as the portion of the plow blade moves closer to the boundary until reaching a prescribed second distance, upon which the at least one light emitting device is continually illuminated.

6. The plow collateral damage mitigating system according to claim 5, wherein the at least one positional indicator mast comprises a first positional indicator mast attached to a first portion of the plow blade and a second positional indicator mast attached to a second portion of the plow blade, the first positional indicator mast having a first warning light portion with a first light emitting device, and the second positional indicator mast having a second warning light portion with a second light emitting device; and
wherein the first light emitting device of the first warning light portion of the first positional indicator mast is configured to be illuminated at a first blink rate, and the second light emitting device of the second warning light portion of the second positional indicator mast is configured to be illuminated at a second blink rate that is faster than the first blink rate when the second portion of the plow blade is located closer to the boundary as compared to the first portion of the plow blade.

7. The plow collateral damage mitigating system according to claim 3, wherein the at least one positional indicator mast further comprises a first boundary hazard subsection and a second boundary hazard subsection, the first boundary hazard subsection comprising first markings or one or more words that indicate to the plow operator that the boundary comprises soft boundary conditions, the second boundary hazard subsection comprising second markings or one or more words that indicate to the plow operator that the boundary comprises solid boundary conditions, the first markings or one or more words on the first boundary hazard subsection configured to be illuminated when the boundary is determined to comprise soft boundary conditions, and the second markings or one or more words on the second boundary hazard subsection configured to be illuminated when the boundary is determined to comprise solid boundary conditions.

8. The plow collateral damage mitigating system according to claim 1, wherein the one or more receivers are provided as part of the at least one positional indicator mast such that the at least one positional indicator mast is configured as a standalone unit for mounting on the snow plow device or the vehicle.

9. The plow collateral damage mitigating system according to claim 1, further comprising a control unit operatively coupled to the one or more receivers and the at least one positional indicator mast, the control unit configured to automatically control the illumination of the at least one positional indicator mast based upon the at least one signal of the signal transmission cable that is indicative of the proximity of the boundary of the surface to be cleared of snow.

10. A plow collateral damage mitigating system, comprising:
a signal transmission cable configured to be disposed along a transition boundary between a paved surface and a friable surface of an area that is to be plowed by a snow plow device, the signal transmission cable including at least one signal wire, the at least one signal wire configured to convey at least one signal originating from a signal transmitter disposed in or proximate to the area;
one or more receivers configured to be coupled to the snow plow device or a vehicle on which the snow plow device is mounted, the one or more receivers configured to receive the at least one signal conveyed by the at least one signal wire of the signal transmission cable;
at least one actuator controlling an orientation of a plow blade of the snow plow device; and
a control unit operatively coupled to the one or more receivers and the at least one actuator, the control unit configured to automatically raise the plow blade of the snow plow device by means of adjusting the at least one actuator based upon the at least one signal of the signal transmitter cable at the transition boundary between the paved surface and the friable surface so as to avoid damaging the friable surface of the area being plowed.

11. The plow collateral damage mitigating system according to claim 10, further comprising a wheel disposed below, and connected to the at least one actuator; and
wherein the control unit is configured to automatically lower the wheel by means of the at least one actuator upon encountering the transition boundary so as to raise the plow blade of the snow plow device to avoid damaging the friable surface of the area being plowed.

12. The plow collateral damage mitigating system according to claim 10, wherein the control unit is configured to raise the plow blade of the snow plow device upon encountering the transition boundary by utilizing the at least one actuator to lift the entire plow blade to avoid damaging the friable surface of the area being plowed.

13. The plow collateral damage mitigating system according to claim 10, wherein the control unit is configured to automatically identify one or more areas containing friable surfaces that are to be plowed by storing and accessing Global Positioning System (GPS) coordinates of the one or more areas.

14. The plow collateral damage mitigating system according to claim 13, wherein the control unit comprises a calibration dial or switch configured to allow a plow operator to input specific surface conditions of the one or more areas containing friable surfaces so that the control unit is able to automatically vary a height of the plow blade and/or customize audial and/or visual cues based upon the specific surface condition of a particular friable surface.

15. A plow collateral damage mitigating system, comprising:
at least one signal transmitter disposed in or proximate to a roadside area that is to be plowed by a snow plow device, the at least one signal transmitter configured to emit at least one signal;
one or more receivers configured to be coupled to the snow plow device or a vehicle on which the snow plow device is mounted, the one or more receivers configured to receive the at least one signal emitted from the at least one signal transmitter;
at least one actuator controlling an orientation of a wing plow blade of the snow plow device; and
a control unit operatively coupled to the one or more receivers and the at least one actuator, the control unit configured to automatically control the orientation of the wing plow blade of the snow plow device by means of adjusting the at least one actuator based upon the at least one signal of the at least one signal transmitter so as to avoid damaging a boundary feature and/or obstruction disposed in or proximate to the roadside area being plowed.

16. The plow collateral damage mitigating system according to claim 15, wherein the at least one actuator controls the orientation of the wing plow blade of the snow plow device by rotating the wing plow blade in a transverse plane so as to avoid damaging the boundary feature and/or obstruction disposed in or proximate to the roadside area being plowed.

17. The plow collateral damage mitigating system according to claim 15, wherein the at least one actuator controls the orientation of the wing plow blade of the snow plow device by lifting one end of the wing plow blade so as to avoid damaging the boundary feature and/or obstruction disposed in or proximate to the roadside area being plowed.

18. The plow collateral damage mitigating system according to claim 15, wherein the control unit comprises a plurality of setting controls for controlling an operation of the wing plow blade of the snow plow device, the plurality of setting controls being selected from the group consisting of: (i) stowing and deploying controls for the wing plow blade, (ii) angle of deployment controls for increasing and decreasing an angle of deployment of the wing plow blade, (iii) height of deployment controls for increasing and decreasing a height of deployment of the wing plow blade, (iv) auto-retraction controls for enabling and disabling auto-retraction of the wing plow blade, and (v) auto-redeployment controls for enabling and disabling auto-redeployment of the wing plow blade.

* * * * *